(12) United States Patent
Jung et al.

(10) Patent No.: US 11,301,197 B2
(45) Date of Patent: Apr. 12, 2022

(54) DISPLAY APPARATUS, METHOD FOR CONTROLLING DISPLAY APPARATUS AND RECORDING MEDIA THEREOF

(71) Applicant: Samsung Electronics Co., Ltd., Suwon-si (KR)

(72) Inventors: Minchul Jung, Suwon-si (KR); Kwansik Yang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/032,973

(22) Filed: Sep. 25, 2020

(65) Prior Publication Data

US 2021/0103420 A1 Apr. 8, 2021

(30) Foreign Application Priority Data

Oct. 4, 2019 (KR) .......................... 10-2019-0122766

(51) Int. Cl.
*G06F 3/14* (2006.01)
*G09G 3/20* (2006.01)

(52) U.S. Cl.
CPC .......... *G06F 3/1423* (2013.01); *G06F 3/1454* (2013.01); *G09G 3/20* (2013.01);
(Continued)

(58) Field of Classification Search
CPC ....... G06F 3/1423; G06F 3/1454; G09G 3/20; G09G 2354/00; G09G 2360/04;
(Continued)

(56) References Cited

U.S. PATENT DOCUMENTS 8,826,347 B1 * 9/2014 Earle ................... H04N 21/4622
725/91
8,869,207 B1 * 10/2014 Earle ................ H04N 21/25808
725/48

(Continued)

FOREIGN PATENT DOCUMENTS

KR 10-2003-0058086 A 7/2003
KR 10-2013-0032582 A 4/2013
KR 10-1627212 B1 5/2016

OTHER PUBLICATIONS

Written Opinion of the International Searching Authority (PCT/ISA/237) and International Search Report (PCT/ISA/210) dated Jan. 20, 2021, in corresponding International Patent Application No. PCT/KR2020/013060.

*Primary Examiner* — Tom V Sheng
(74) *Attorney, Agent, or Firm* — Staas & Halsey LLP

(57) ABSTRACT

A display apparatus includes: a display; a receiver configured to receive a broadcast signal having a plurality of channels; a communication interface configured to communicate with a server; and a processor configured to control the display to display an image of a first channel among the plurality of channels based on the broadcast signal received through the receiver, execute an application to receive content data for content selected by a user from content provided from the executed application from the server through the communication interface and to control the display to display a content image, and allocate the content corresponding to the displayed content image to a second channel among the plurality of channels based on an execution of an operation of allocating a virtual channel based on a predetermined user input while the content image is displayed.

20 Claims, 20 Drawing Sheets

(52) U.S. Cl.
CPC ..... *G09G 2354/00* (2013.01); *G09G 2360/04* (2013.01); *G09G 2370/06* (2013.01)

(58) Field of Classification Search
CPC ............. G09G 2370/06; H04N 21/462; H04N 21/4622; H04N 21/47208; H04N 21/431; H04N 21/26258; H04N 21/266; H04N 21/2665
USPC .......................................................... 345/1.1
See application file for complete search history.

(56) References Cited

U.S. PATENT DOCUMENTS

| | | | | |
|---|---|---|---|---|
| 8,875,184 | B1* | 10/2014 | Bakare | H04N 21/25891 |
| | | | | 725/41 |
| 9,900,657 | B2* | 2/2018 | Hong | H04N 21/4782 |
| 9,948,997 | B2* | 4/2018 | Lincke | H04N 21/4788 |
| 10,708,670 | B2* | 7/2020 | Choi | H04N 21/485 |
| 2006/0156341 | A1 | 7/2006 | Kim | |
| 2009/0199239 | A1* | 8/2009 | Chaki | H04N 21/4312 |
| | | | | 725/39 |
| 2009/0254963 | A1 | 10/2009 | Lee et al. | |
| 2010/0070773 | A1* | 3/2010 | Tanaka | H04N 21/4622 |
| | | | | 713/176 |
| 2010/0218211 | A1* | 8/2010 | Herigstad | H04N 21/4722 |
| | | | | 725/34 |
| 2010/0287587 | A1* | 11/2010 | Patten | H04N 21/2668 |
| | | | | 725/39 |
| 2013/0033643 | A1* | 2/2013 | Kim | H04N 21/44218 |
| | | | | 348/563 |
| 2014/0165104 | A1* | 6/2014 | Choi | H04N 5/445 |
| | | | | 725/40 |
| 2015/0289024 | A1* | 10/2015 | Yoon | H04N 21/2668 |
| | | | | 725/40 |
| 2016/0227273 | A1* | 8/2016 | Lee | H04N 21/4384 |
| 2016/0286263 | A1* | 9/2016 | Jung | H04N 21/4384 |
| 2016/0299676 | A1* | 10/2016 | Yoon | G06F 3/1454 |
| 2016/0364094 | A1* | 12/2016 | Shin | H04N 21/466 |
| 2018/0225076 | A1* | 8/2018 | Kim | G06F 3/1423 |
| 2018/0227619 | A1 | 8/2018 | Chien et al. | |
| 2018/0352299 | A1* | 12/2018 | Wu | H04N 21/4823 |
| 2019/0132381 | A1* | 5/2019 | Momchilov | G09G 5/14 |

* cited by examiner

DISPLAY APPARATUS, METHOD FOR CONTROLLING DISPLAY APPARATUS AND RECORDING MEDIA THEREOF

CROSS-REFERENCE TO RELATED APPLICATION

This application is based on and claims priority under 35 U. S. C. § 119 to Korean Patent Application No. 10-2019-0122766, filed on Oct. 4, 2019, the disclosure of which is herein incorporated by reference in its entirety.

BACKGROUND

1. Field

The disclosure relates to a display apparatus, a method for controlling the display apparatus, and recording media thereof, and more particularly, to a display apparatus capable of receiving and displaying content from a server, a method for controlling the display apparatus, and recording media thereof

2. Discussion of Related Art

A display apparatus such as a television (TV) receives a broadcast signal of a predetermined channel and displays an image based on the received broadcast signal.

The display apparatus may receive various content from a server connected through a network such as the Internet as well as a broadcast signal, and display an image based on the content.

A user may execute predetermined applications on various devices including a display apparatus, such as a television, a smartphone, a tablet, and a computer, to view content provided from a server of the application.

The user may want to keep viewing his/her preferred content, for example, previously viewed content through a display apparatus.

In this case, cumbersome processes, such as executing an application related to the content in the display apparatus, performing user authentication, and selecting or searching for the content, may be required, thereby causing inconvenience to the user.

SUMMARY

According to an aspect of an embodiment, provided is a display apparatus, including: a display; a receiver configured to receive a broadcast signal having a plurality of channels; a communication interface configured to communicate with a server; a user input interface configured to receive user input; and a processor configured to control the display to display an image of a first channel among the plurality of channels based on the broadcast signal received through the receiver, execute an application to receive content data for content selected by a user from content via from the executed application from a server through a communication interface and to control the display to display a content image corresponding to the content selected by the user, add a second channel corresponding to the content selected by the user to the plurality of channels based on a first user input while the content image is displayed, and access the server through the communication interface to display the content image based on a selection of the second channel according to user input.

The first user input may include user input for switching an application being executed in a foreground mode to a background mode.

The processor may determine whether or not a predefined viewing condition is satisfied based on a user's viewing history of the content selected by the user when an operation of registering a virtual channel is performed, and then may add the second channel corresponding to the content selected by the user when the predefined viewing condition is satisfied.

The processor may receive the information on the viewing history or the viewing condition from the application.

The processor may allow the application to perform an operation of registering a virtual channel, and add the second channel corresponding to the content selected by the user based on a request received from the application performing the operation of allocating registering the virtual channel.

The processor may receive information on a virtual channel from the server, and identify the second channel to be used as the virtual channel or add the second channel corresponding to the content selected by the user based on the received information on the virtual channel.

The information on the virtual channel may include information on content corresponding to the virtual channel added by an external device or content viewed by the external device.

The processor may transmit information on the second channel to be used as a virtual channel or the content corresponding to the added second channel to the server.

The processor may control the display to display a UI related to registration of the virtual channel.

The UI may include an item for selecting whether or not to register the virtual channel for the content selected by the user, and the processor may execute the operation of registering the virtual channel based on user input for the item.

The processor may control the communication interface to receive the content data for the content from the server based on URL of the content, in response to the selection of the second channel.

The content corresponding to the added second channel may include a plurality of sub-content consisting of a series, and the processor may release the content selected by the user form the second channel based on the viewing of the plurality of sub-content being completed.

According to another aspect of the disclosure, provided is a method for controlling a display apparatus, including: displaying an image of a first channel of a plurality of channels based on a broadcast signal received through a receiver; executing an application to receive content data for content selected by a user from a content provided via the executed application from a server through a communication interface and to display a content image; adding a second channel corresponding to the content selected by the user to the plurality of channels, on the basis of an execution of an operation of registering a virtual channel based on a first predetermined user input while the content image is displayed; and accessing the server through the communication interface to display the content image corresponding to the content based on a selection of the second channel according to user input.

The first user input may include user input for switching an application being executed in a foreground mode to a background mode.

The adding the second channel may include: determining whether a predefined viewing condition is satisfied based on a user's viewing history of the content being displayed when the operation of registering the virtual channel is executed;

and adding the second channel corresponding to the content selected by the user when the predefined viewing condition is satisfied.

In the adding the second channel, the application may perform the operation of registering the virtual channel, and the second channel corresponding to content selected by the user may be added based on a request received from the application performing the operation of registering the virtual channel.

The method for controlling a display apparatus may further include displaying a UI related to the registration of the virtual channel.

The accessing the server may including receiving the content data for the content from the server based on URL of the content, in response to the selection of the second channel.

The content corresponding to the added second channel may include a plurality of sub-content consisting of a series, and the method for controlling a display apparatus may further include releasing the content selected by the user form the second channel based on the viewing of the plurality of sub-content being completed.

According to still another aspect of the disclosure, provided is a computer-readable nonvolatile recording media recorded with a program of a method the can be executed by a processor of a display apparatus, in which the method including: displaying an image of a first channel of a plurality of channels based on a broadcast signal received through a receiver; executing an application to receive content data for a content selected by a user from contents provided via the executed application from a server through a communication interface and to display a content image; adding a second channel corresponding to content selected by the user to the plurality of channels, on the basis of an execution of an operation of registering a virtual channel based on a first user input while the content image is displayed; and accessing the server through the communication interface to display the content image corresponding to the content based on a selection of the second channel according to user input.

According to the display apparatus of the disclosure, the method for controlling the display apparatus, and the recording media thereof of the disclosure as described above, it is possible to improve the user's accessibility to the content with the high user preference by allocating the content expected to be continuously viewed by the user to the virtual channel of the display apparatus.

In addition, according to the display apparatus, the method for controlling the display apparatus, and the recording media thereof of the disclosure, it is possible to more improve the user convenience considering the characteristics of content itself as well as reflecting the user preference by allocating continuous content, such as a series consisting of a plurality of sub-content, to the virtual channel.

BRIEF DESCRIPTION OF THE DRAWINGS

The above and other aspects, features, and advantages of certain embodiments of the disclosure will be more apparent from the following description taken in conjunction with the accompanying drawings.

DETAILED DESCRIPTION

Figure 1:
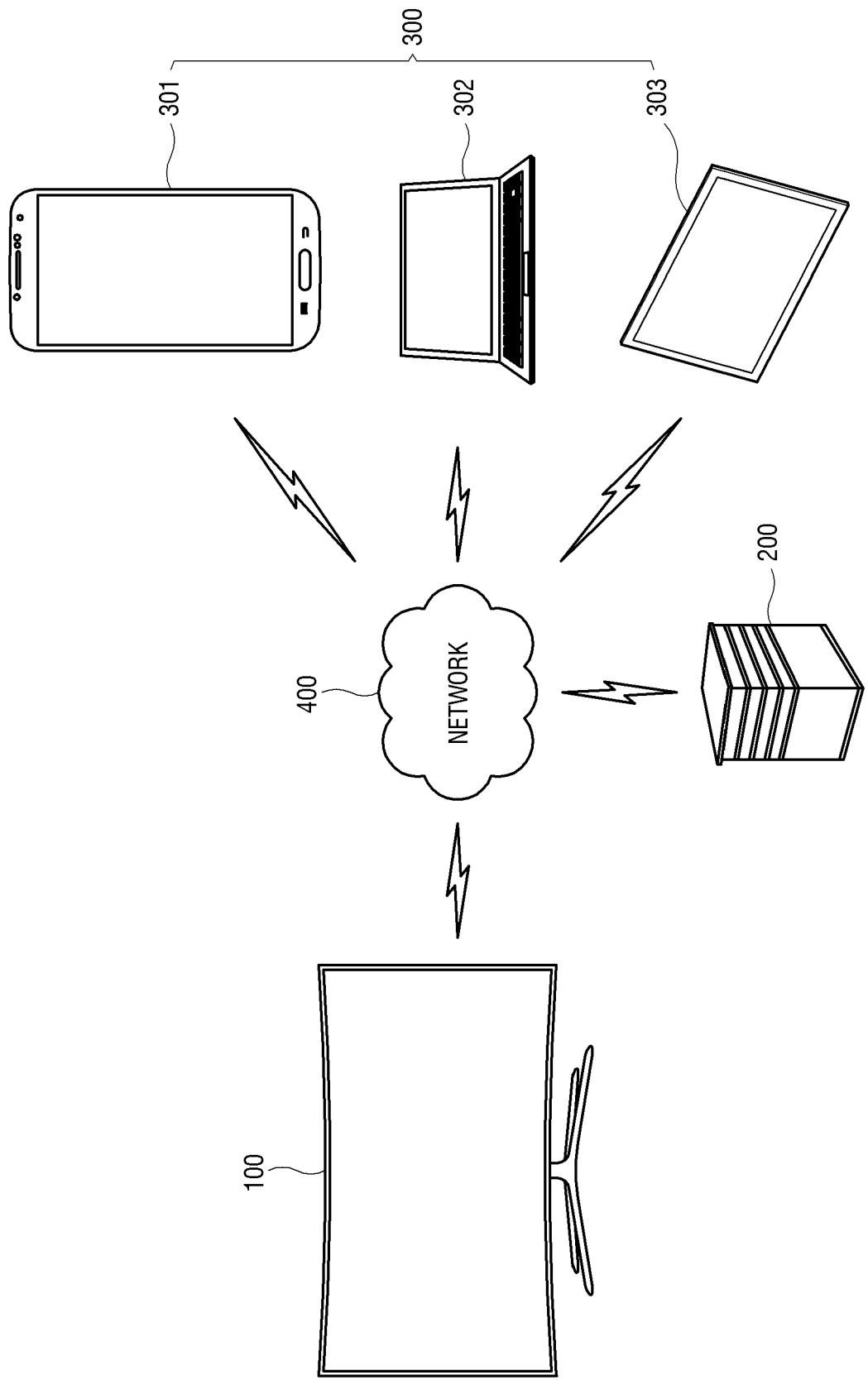
FIG. 1 is a diagram illustrating an example of a display system according to an embodiment of the disclosure.

Hereinafter, embodiments of the disclosure will be described in detail with reference to the accompanying drawings. In the drawings, the same reference numbers or signs refer to components that perform substantially the same function, and the size of each component in the drawings may be exaggerated for clarity and convenience. However, the technical idea and the core configuration and operation of the disclosure are not limited only to the configuration or operation described in the following examples. In describing the disclosure, if it is determined that a detailed description of the known technology or configuration related to the disclosure may unnecessarily obscure the subject matter of the disclosure, the detailed description thereof will be omitted.

In embodiments of the disclosure, terms including ordinal numbers such as first and second are used only for the purpose of distinguishing one component from other components, and singular expressions include plural expressions unless the context clearly indicates otherwise. Also, in embodiments of the disclosure, it should be understood that terms such as 'configured', 'include', and 'have' do not preclude the existence or addition possibility of one or more other features or numbers, steps, operations, components, parts, or combinations thereof. In addition, in the embodiment of the disclosure, a 'module' or a 'unit' performs at least one function or operation, and may be implemented in hardware or software, or a combination of hardware and software, and may be integrated into at least one module. In addition, in embodiments of the disclosure, at least one of the plurality of elements refers to not only all of the plurality of elements, but also each one or all combinations thereof excluding the rest of the plurality of elements.

The disclosure is to provide a display apparatus for improving user's accessibility to content with high user preference by allocating content expected to be continuously viewed by a user to a virtual channel of the display apparatus, a method for controlling the display apparatus, and recording media thereof FIG. 1 is a diagram illustrating an example of a display system according to an embodiment of the disclosure.

As illustrated in FIG. 1, the display system according to the embodiment of the disclosure includes a display apparatus 100 and a server 200.

The display apparatus 100 may access the server 200 through a wired or wireless network 400 such as the Internet.

The display apparatus 100 receives a signal, such as content data for predetermined content, which is provided from an external signal supply source including the server 200, that is, an image source, and processes the received content data according to a preset process and displays the processed received content data as an image.

According to one embodiment, as illustrated in FIG. 1, the display apparatus 100 may be implemented as a television (TV) capable of processing a broadcast image based on at least one of a broadcast signal, broadcast information, or broadcast data received from sending equipment of a broadcasting station.

When the display apparatus 100 is a television, the display apparatus 100 may receive broadcast content based on at least one of the broadcast signal, the broadcast information, or the broadcast data received from the sending equipment of the broadcasting station through additional devices, such as, a set-top box (STB), a one-connect box, and a media box, that may be directly connected to the display apparatus 100 or connected to the display apparatus 100 by a cable or the like. Here, a connection method between the display apparatus 100 and the additional device is not limited to the cable, and various wired/wireless interfaces may be applied.

The display apparatus 100 may wirelessly receive a radio frequency (RF) signal, that is, a broadcast signal that is transmitted from a broadcasting station. To this end, the display apparatus 100 or at least one of the additional devices may be provided with an antenna capable of receiving broadcast signals having a plurality of channels and a tuner for tuning the broadcast signals for each channel.

The broadcast signal received by the display apparatus 100 can be received through terrestrial waves, cables, satellites, and the like, and the signal supply source according to the disclosure is not limited to the broadcast station. That is, any apparatus or station capable of transmitting and receiving data may be included in the image source according to the disclosure.

A standard of the signal received by the display apparatus 100 may be configured in various ways corresponding to the implementation form of the apparatus, and the display apparatus 100 may receive content in a wired manner by, for example, a high definition multimedia interface (HDMI), composite video, component video, super video, Syndicat des Constructeurs d'Appareils Radiorécepteurs et Téléviseurs (SCART), a universal serial bus (USB), and the like.

The display apparatus 100 may receive content by wired or wireless network communication from various external devices including the server 200, and a type of communication is not limited thereto.

Specifically, the display apparatus 100 may perform at least one of wireless communications through an access point (AP) or wireless communication directly connected to other devices without the access point. For example, the display apparatus 100 may receive content from the image source through wireless network communications such as Wi-Fi, Wi-Fi direct, or Bluetooth. In addition, the display apparatus 100 may receive content through a wired network communication such as Ethernet.

The display apparatus 100 may execute predetermined applications for playing content to receive content from the server 200 and process the received content, so a content image corresponding to the processed content may be output, that is, displayed on a screen. Here, the display apparatus 100 may receive the content from the server 200 using a user account corresponding to the executed application.

In addition, the display apparatus 100 may process a signal so that a moving image, a still image, an application, an on-screen display (OSD), a user interface for various operation controls, and the like based on signals/data stored in internal/external storage media are displayed on the screen.

According to one embodiment, the display apparatus 100 may be implemented as a smart TV or an internet protocol TV (IP TV). The smart TV may receive and display the broadcast signal in real time, and has a web browsing function, so the smart TV is a TV that can provide a convenient user environment for searching and consuming various content through the Internet while displaying the broadcast signal in real time. In addition, the smart TV may include an open software platform to provide interactive services to users. Therefore, the smart TV can provide various content, for example, content of applications providing predetermined services, to users through the open software platform. These applications are application programs that may provide various types of services, and include, for example, applications that provide services such as social networking service (SNS), finance, news, weather, maps, music, movies, games, and e-books.

However, since the idea of the disclosure is not limited to the implementation example of the display apparatus 100, the display apparatus 100 may also be applied to various types of implementation examples capable of processing an image, such as a monitor connected to the computer body, in addition to a TV.

According to one embodiment, the plurality of display apparatuses 100 as described above may be provided in the display system. In this case, each display apparatus 100 may receive content from the server 200 by accessing the server 200 through the network 400.

The server 200 may transmit content to various devices including the display apparatus 100 through the network 400.

According to one embodiment, the server 200 may provide a media file such as a video on demand (VOD), a web content, or the like in a real-time streaming manner.

According to one embodiment, a plurality of servers 200 may be provided. The display system can be implemented to include a plurality of servers (hereinafter, referred to as a content providing server) for providing content such as an over the top (OTT) server capable of providing an OTT service such as Netflix and a web server capable of providing web content such as YouTube.

In another embodiment, the display system may further include an account management server capable of managing a user account of the display apparatus 100 by linking the user account of the display apparatus 100 to a user account of one or more content providing servers 200. Here, the account management server may be operated by a manufacturer of the display apparatus 100 or a service provider such as a broadcasting service provider or a communication service provider.

The display apparatus 100 may receive content from each connected server 200 by accessing each of the plurality of content providing servers 200.

The server 200 stores and manages each user account information. The user account information may include security information.

According to one embodiment, the server 200 may store and manage the user account information by linking the user account information to the preferred content information based on a viewing history.

The preferred content is content viewed by the user, and may include content that is currently being viewed or has been viewed. Here, the preferred content may further include content searched by a user or content selected by clicking.

In addition, the preferred content may include similar content, and the server 200 may identify, as similar content, content of a genre similar to the content viewed by the user, content selected or viewed by other users who have viewed the same content as the content viewed by the user, or the like.

The server 200 manages preferred content for each user, and the preferred content information may be provided to devices corresponding to the user account, including the display apparatus 100.

According to one embodiment, the server 200 may store and manage the user account information by linking the user account information to one or more electronic apparatuses. Here, the electronic apparatus associated with the account information may further include not only the display apparatus 100, but also at least one terminal apparatus 300 described later.

The display system according to the embodiment of the disclosure may further include at least one terminal apparatus 301, 302, and 303 as the external device 300 of the display apparatus 100.

As illustrated in FIG. 1, the terminal apparatuses 301, 302, and 303 may include a smartphone 301, a personal computer (PC) 302 such as a laptop or a desktop, a tablet 303, and the like. However, the type of terminal apparatuses 301, 302, and 303 provided as the external device 300 in the disclosure is not limited. In some cases, the display system may be provided with the same type of apparatuses, for example, a plurality of smartphones 301.

Each terminal apparatus 301, 302, and 303 may receive content from the server 200 by accessing the server 200 through the network 400.

In detail, each terminal apparatus 301, 302, and 303 may execute predetermined applications for playing content to receive content from the server 200 and process the received content, so the image of the processed content may be output, that is, displayed on a screen.

According to one embodiment, each terminal apparatus 301, 302, and 303 may execute the application using the same user account as the display apparatus 100 to receive content from the server 200.

In another embodiment, each terminal apparatus 301, 302, and 303 may execute an application using a sub account linked to the user account as the display apparatus 100 to receive content from the server 200. For example, when the display apparatus 100 uses an account of a representative (hereinafter, also referred to as a representative account) among family members, accounts of the other members other than the representative may be an example of sub accounts. As another example, a specific user account and an account registered as a friend may be examples of sub accounts.

The user account information including such a representative account and sub accounts linked to the representative account may be stored and managed by the server 200. In addition, as described above, the server 200 is implemented to be able to store and manage the preferred content and the electronic apparatuses for each user account.

Hereinafter, each configuration of the display system according to the disclosure will be described with reference to the drawings.

Figure 2:
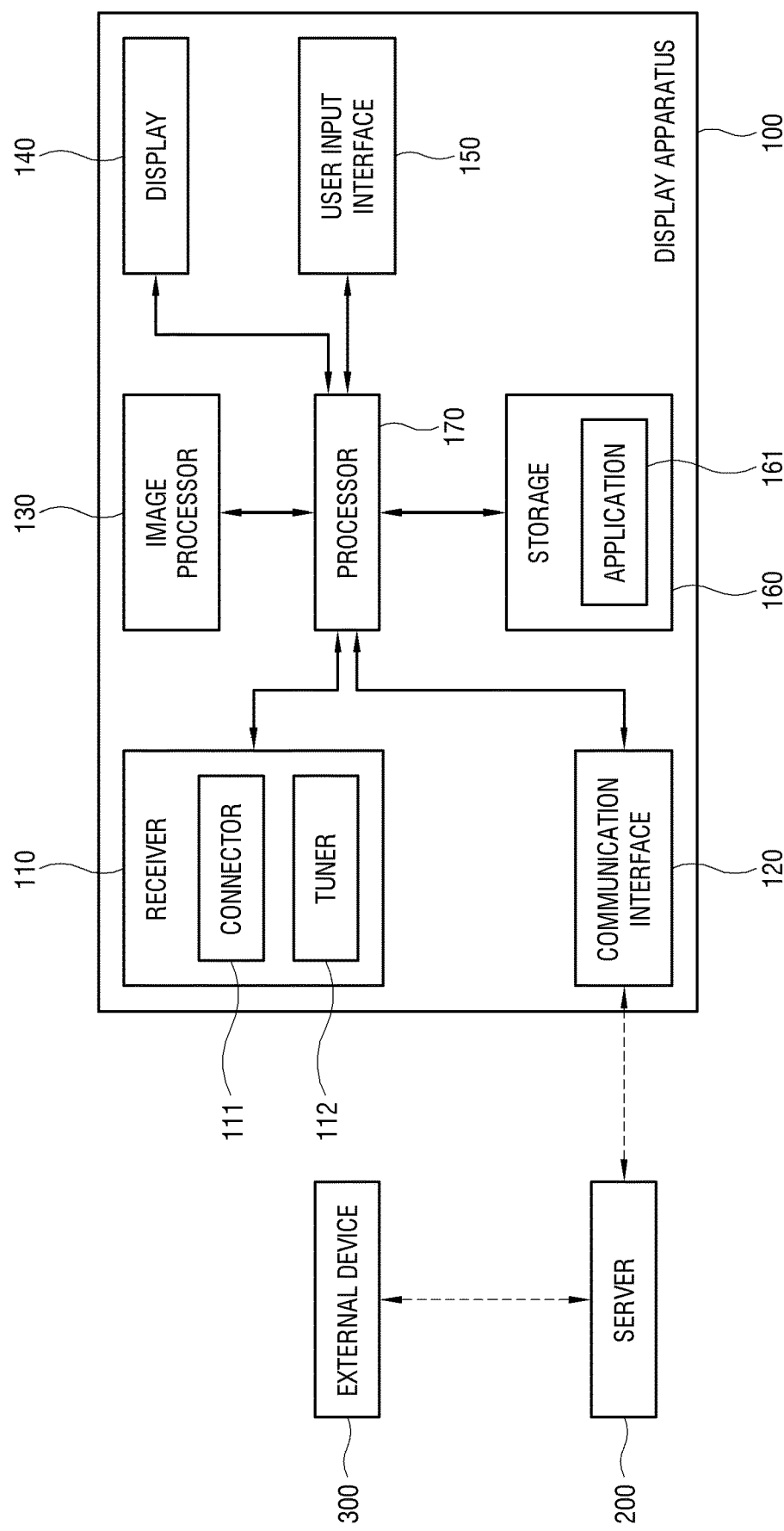
FIG. 2 is a block diagram illustrating a configuration of a display apparatus according to the embodiment of the disclosure.

FIG. 2 is a block diagram illustrating a configuration of the display apparatus according to the embodiment of the disclosure.

As illustrated in FIG. 2, the display apparatus 100 includes a receiver 110, a communication interface 120, an image processor 130, a display 140, a user input interface 150U, a storage 160, and a processor 170. The receiver 110 may include a connector 111 and a tuner 112.

The configuration included in the display apparatus 100 is not limited to the above-described embodiment, and may be implemented by excluding or changing some configurations or including additional other configurations.

The receiver 110 receives a signal (content) from the outside. Here, the standard of the received signal may be configured in various ways corresponding to the implementation form of the display apparatus 100. For example, the receiver 110 may wirelessly receive a radio frequency (RF) signal transmitted from a broadcasting station (not illustrated), or receive signals according to composite video, component video, super video, SCART, high definition multimedia interface (HDMI), display port (DP) standards, and the like in a wired manner.

The receiver 110 may include the connector 111 that allows the display apparatus 100 to be connected to an additional device capable of receiving content from an external image source in a wired manner. According to one embodiment, the connector 111 is connected to the additional device through an HDMI cable, but the connection method is not limited to the HDMI.

The display apparatus 100 may receive a signal of content from an additional device such as a set-top box through the wired connector 111. Here, the signal of the content includes a broadcast signal. The connector 111 basically receives the signal from the additional device, but may be provided to transmit and receive signals in both directions.

The connector 111 may be implemented as circuitry including a data input/output interface in which communication modules (S/W module, chip, and the like), a port, and the like that correspond to a predetermined communication protocol are combined.

According to one embodiment, an apparatus that is connected to the display apparatus 100 through the connector 111 in a wired manner is an additional device such as a set-top box, but the disclosure is not limited thereto. For example, as another embodiment, the display apparatus 100 may be wired to a mobile apparatus through the connector 111.

According to one embodiment, the receiver 110 includes the tuner 112 for tuning the broadcast signal for each channel when the received signal is the broadcast signal. The tuner 112 may include a demodulator that demodulates a tuned broadcast signal of a specific channel and outputs the demodulated broadcast signal as a transport stream (TS) type signal. In other words, the tuner and the demodulator may be designed as a single chip in an integrated form, or may each be implemented as two separate chips.

In addition, the signal may be from data stored in a nonvolatile storage 160 such as a flash memory or a hard disk. The storage 160 may be provided inside or outside the display apparatus 100, and when the storage 160 is provided outside the display apparatus 100, the storage 160 may be connected to the display apparatus 100 through the connector 111.

The communication interface 120 is provided to be able to communicate with the server 200 and the external devices including the terminal apparatuses 301, 302, and 303 in a wired or wireless communication method. The communication interface 120 includes a wired and/or wireless communication module.

The communication interface 120 may be implemented as the circuitry including the communication modules (S/W module, chip, and the like) corresponding to the predetermined communication protocol.

According to one embodiment, the communication interface 120 includes a wireless LAN unit. The wireless LAN unit may perform wireless communication with at least one external device through an access point under the control of the processor 170. The wireless LAN unit includes a Wi-Fi communication module.

According to one embodiment, the communication interface 120 is at least one of short-range communication modules such as Bluetooth, Bluetooth low energy, radio frequency (RF) communication, Wi-Fi direct, Zigbee, ultra wideband (UWB), near field communication (NFC), infrared communication (IrDA), and the like. The short-range communication module is provided to directly support wireless communication between the display apparatus 100 and the server 200 or the external device in a wireless manner without the access point.

According to one embodiment, the communication interface 120 may further include a wired communication module such as Ethernet.

The communication interface 120 of the display apparatus 100 according to the disclosure embodiment may be constituted by one or two or more combinations of the wireless LAN unit, the short-range communication module, and the wired communication module depending on performance.

The image processor 130 performs various preset processes on the received signal. The image processor 130 outputs the generated or combined output signals to the display 140 by performing this process, and as a result, displays an image corresponding to an image signal on the display 140.

The image processor 130 includes a decoder that decodes an image signal to correspond to an image format of the display apparatus 100, and a scaler that adjusts the image signal to match an output standard of the display 140.

In an embodiment, the decoder is, for example, an H.264 decoder, but is not limited thereto. That is, the video decoder according to the embodiment of the disclosure may be implemented as a decoder according to various compression standards such as a moving picture experts group (MPEG) decoder or a high efficiency video codec (HEVC) decoder.

In addition, the type of content processed by the image processor 130 in the disclosure is not limited. For example, the content that can be processed by the image processor 130 may further include not only a moving image such as a video, but also still images such as a picture such as a JPEG file and a background screen, and a graphical user interface (GUI).

The type of the image processing process performed by the image processor 130 of the disclosure is not limited, and the image processor 130 may perform at least one of various processes such as de-interlacing that converts an interlace type broadcast signal into a progressive type, noise reduction for improving an image quality, detail enhancement, frame refresh rate conversion, and line scanning.

The image processor 130 may be implemented as a group of individual configurations capable of independently performing each of the processes, or may be implemented as a form included in a main system-on-chip (SoC) in which various functions are integrated. The main SoC may include at least one microprocessor, application processor, or CPU, which is an example of implementing the processor 170 described below.

According to one embodiment, the image processor 130 may be implemented as an image board in which various circuit configurations, such as various chipsets, memories, electronic components, and wirings, for performing each of the processes are mounted on a printed circuit board (PCB). In this case, the receiver 110, the image processor 130, and the processor 170 that are included in the display apparatus 100 may be provided on a single image board. Naturally, this is only an example, and these components may be disposed on a plurality of printed circuit boards communicatively connected to each other.

In the display apparatus 100 according to the disclosure, the image processor 130 processes a corresponding signal to display an image of a predetermined channel based on the broadcast signal received through the receiver 110. In addition, the image processor 130 processes the signal to display an image of predetermined content based on the signal from the server 200 through the communication interface 120.

The signal processed by the image processor 130 is output to the display 140.

The display 140 displays an image corresponding to the image signal received from the image processor 130.

According to one embodiment, the display 140 may display a user interface (UI) including an item (menu item) capable of selecting whether to allocate a virtual channel for content of an application received through the communication interface 120.

The implementation scheme of the display 140 is not limited, and the display 140 may be implemented in various display schemes such as liquid crystal, plasma, a light-emitting diode, an organic light-emitting diode, a surface-electron gun conduction electron-emitter, carbon nano-tube, and nano-crystal. The display 140 may additionally include an additional configuration, for example, a driver, depending on the implementation scheme.

The user input interface 150 transmits various preset control commands or unlimited information to the processor 170 by user input.

The display apparatus 100 according to the embodiment of the disclosure may allow the display 140 to display an image of predetermined content based on a selection of a channel according to user input through the user input interface 150. Here, the channel that can be selected by the user further includes a second channel to which the content, such as a media file such as VOD or web content, which is received through the communication interface 120, is allocated, as well as a first channel to which the broadcast content received through the receiver 110 is allocated.

The user input interface 150 may receive user input that activates an automatic allocation option of a virtual channel of the display apparatus 100.

According to one embodiment, the user input interface 150 may receive the user input to allocate the media file or the web content to the second channel that can be used as a virtual channel among a plurality of channels. In another embodiment, the display apparatus 100 may automatically allocate the media file or the web content to the second channel that can be used as the virtual channel, and receive the user input to approve or reject the allocated media file or web content through the user input interface 150.

The user input interface 150 includes a keypad (or input panel) including buttons such as a power key, a number key, and a menu key provided on a main body of the display apparatus 100.

According to one embodiment, the user input interface 150 includes an input apparatus that generates a preset command/data/information/signal to be able to remotely control the display apparatus 100 and transmits the generated preset command/data/information/signal to the display apparatus 100. The input apparatus includes a remote control, a keyboard, a mouse, and the like, and may be separated from the main body of the display apparatus 100 to receive the user input. The remote control may be provided with a touch sensor that receives a user's touch input and/or a motion sensor that senses motion of the remote control by user. The input apparatus includes a terminal apparatus such as a smartphone in which a remote control application is installed. In this case, the input apparatus can receive the user's touch input through the touch screen.

The input apparatus becomes an external device capable of the wireless communication with the main body of the display apparatus 100, and the wireless communication includes the Bluetooth, the infrared communication, the RF communication, the wireless LAN, the Wi-Fi Direct, and the like.

According to one embodiment, the user input interface 150 may further include a voice input interface that receives voice/sound uttered from the user. The voice input interface may be implemented as a microphone capable of receiving user voice.

The storage 160 is configured to store various data of the display apparatus 100. The storage 160 should store data even when power supplied to the display apparatus 100 is cut off, and may be provided as a writable nonvolatile memory (writable ROM) to reflect fluctuations. That is, the storage 160 may be provided as any one of a flash memory, EPROM, or EEPROM. The storage 160 may further include a volatile memory such as DRAM or SRAM in which the read or write speed of the display apparatus 100 is faster than that of the nonvolatile memory.

Data stored in the storage 160 includes, for example, various applications that can be executed on the operating system, image data, additional data, and the like, in addition to an operating system for driving the display apparatus 100.

Specifically, the storage 160 may store input/output signals or data corresponding to the operation of each component under the control of the processor 170. The storage 160 stores a control program for controlling the display apparatus 100, a UI related to an application provided by a manufacturer or downloaded from the outside, images for providing the UI, user information, documents, databases, or related data.

According to one embodiment, the storage 160 stores a TV application that allows the display apparatus 100 to operate as a television, and channel maps for a plurality of channels. The display apparatus 100 may execute the TV application so that the channel map may be managed and edited.

The plurality of channels include the first channel to which the broadcast signal, that is, the broadcast content received through the receiver 110 is allocated, and the second channel that can be used as the virtual channel. The second channel is an empty channel to which the broadcast signal is not allocated so that the second channel can be used as the virtual channel. For example, channel Nos. 900 to 1000 may be the second channel. The content, such as the media file such as VOD or the web content, which is received through the communication interface 120 from the server 200 may be allocated to the second channel as described above.

According to one embodiment, as illustrated in FIG. 2, at least one application 161 for receiving and playing content provided by the server 200 is installed or stored in the storage 160. The Netflix application and the YouTube application are examples of the application 161 for playing such content.

The application 161 installed as described above is executed in a foreground mode in the display apparatus 100, so the display apparatus 100 may receive and play, that is, display the media file, the web content, or the like from the server 200 in the real-time streaming manner.

Specifically, the display apparatus 100 may receive, from the server 200, content data for content selected by a user from the content provided from the executed application 161, and display the content image corresponding to the received content data.

In the display apparatus 100 according to one embodiment, the predetermined user input may be received while the application 161 is executed in the foreground mode to play content.

Here, the received predetermined user input is user input for switching the application 161, which is executing in the foreground mode, to the background mode, and may include, for example, user input to stop playing the content being displayed. That is, when a user request to stop playing the content is received as described above, the corresponding application 161 switches the execution state from the foreground mode to the background mode, and the playback of the content of the playing application 161 is stopped, that is, paused.

In other words, when the user stops viewing the content of the application 161 and the display apparatus 100 performs other functions, the application 161 is executing in the background, not completely turned off in the display apparatus 100, for example, while the broadcast content received by the display apparatus 100 through the receiver 110 is displayed on the display 140.

According to one embodiment, the display apparatus 100 allows the operation of allocating the virtual channel to be performed based on the predetermined user input as described above. Specifically, the display apparatus 100 may allocate the content of the executed application 161 to the second channel among the plurality of channels by switching the execution state of the application 161 from the foreground to the background based on the predetermined user input.

Here, the display apparatus 100 may determine whether or not the predefined viewing conditions are satisfied based on a user's viewing history of the content being displayed when the operation of allocating the virtual channel is performed, and then may allocate the corresponding content to the second channel when the predefined viewing conditions are satisfied.

For example, when the execution state of the application 161 is switched from the foreground to the background based on the user request to stop playing the currently playing content, the display apparatus 100 may determine whether the content of the corresponding application 161 is allocated to or registered in the second channel based on time information associated with the playback of the content of the application 161, for example, a play time of the currently playing content, a remaining time, a ratio of a played time in a total running time, and the like.

The time information related to the playback of the content is not limited. For example, when the play time of the playing content is 30 minutes or more, the remaining time, that is, the remaining play time is less than 5 minutes, or the ratio of the played time in the total running time is 30% or more, it may be determined that the content of the executing application 161 is allocated as a channel registration target and allocated to the second channel. Here, a credit time may be excluded from the remaining time.

In another embodiment, the display apparatus 100 may allow the operation of allocating the virtual channel to be performed based on the reception of the user selection of the corresponding content while the application 161 is executing, thereby allocating the content of the executed application 161 to the second channel among the plurality of channels.

Specifically, when the display apparatus 100 receives the user input to subscribe to the channel of the currently playing content, for example, the YouTube channel while playing the content by executing the application 161 in the foreground mode, the display apparatus 100 may allocate or register the content of the corresponding application 161 to or in the second channel.

Here, the processor 170 may perform the operation of allocating the virtual channel as described above in the state in which the automatic allocation option of the virtual channel is activated according to the user input.

Meanwhile, the operation of allocating the virtual channel as described above may be performed by the application 161. That is, the display apparatus 100 may allow the application 161 to perform the operation of allocating the virtual channel, and allocate the content to the second channel based on the request received from the application 161.

The detailed operation of allocating the channel for the content of the application 161 will be described in more detail in the embodiments of FIGS. 5 and 11.

In the embodiment of the disclosure, the term storage is defined as including a storage 160, a ROM (illustrated) and a RAM (not illustrated) in the processor 170, or a memory card (not illustrated) (for example, a micro SD card and a memory stick) that can be mounted in the display apparatus 100.

The processor 170 performs control to operate the overall configurations of the display apparatus 100. The processor 170 may include control programs (or instructions) for performing the control operation, a nonvolatile memory in which control programs are installed, a volatile memory in which at least a part of the installed control programs is loaded, and at least one general-purpose processor, such as a microprocessor, an application processor, or a central processing unit (CPU), for executing the loaded control programs.

The processor 170 may include a single core, a dual core, a triple core, a quad core, or a multiple-number core thereof. The processor 170 includes a plurality of processors, for example, a main processor and a sub processor operating in a sleep mode (for example, only standby power is supplied and does not operate as a display apparatus). In addition, the processor, the ROM, and the RAM can be interconnected via an internal bus.

According to one embodiment, the processor 170 may be implemented as a form included in a main SoC mounted on a PCB embedded in the display apparatus 100. In another embodiment, the main SoC may further include an image processor 130 that processes an image signal.

The control program may include a program(s) implemented in at least one of a BIOS, a device driver, an operating system, firmware, a platform, and an application program. As an embodiment, the application may be pre-installed or stored in the display apparatus 100 at the time of the manufacturing of the display apparatus 100, or installed in the display apparatus 100 based on data of the application program received from the outside when used later. The data of the application may be downloaded to the display apparatus 100 from an external server such as an application market. Such an external server is an example of a computer program product of the disclosure, but is not limited thereto.

According to one embodiment, the processor 170 controls the display 140 to display an image of the first channel among the plurality of channels based on the broadcast signal received through the receiver 110, and executes the application 161 stored in the storage 160 to receive content data for content selected by a user from the content provided from the executed application from the server 200 through the communication interface 120 and to control the display 140 to display a content image. Here, the processor 170 may allocate the content corresponding to the displayed content image to the second channel, on the basis of the execution of the operation of allocating the virtual channel based on the predetermined user input while the content image is displayed.

When the user input for selecting the second channel to which the content is allocated is received through the user input interface 150, the processor 170 controls the display 140 to display the content image corresponding to the content.

As an embodiment, the operation of the processor 170 as described above may be implemented as a computer program stored in a computer program product (not illustrated) separately provided from the display apparatus 100.

In this case, the computer program product includes a memory in which an instruction corresponding to the computer program is stored, and a processor. When executed by the processor, the instruction includes executing an application to receive, from the server 200, content data for content selected by a user from the content provided from the executed application and to display a content image, and allocating the content corresponding to the displayed content image to the second channel among the plurality of channels based on the execution of the operation of allocating the virtual channel based on the user input while the content image is displayed.

Accordingly, the display apparatus 100 may download and execute the computer program stored in the separate computer program product to perform the operation of the processor 170.

Figure 3:
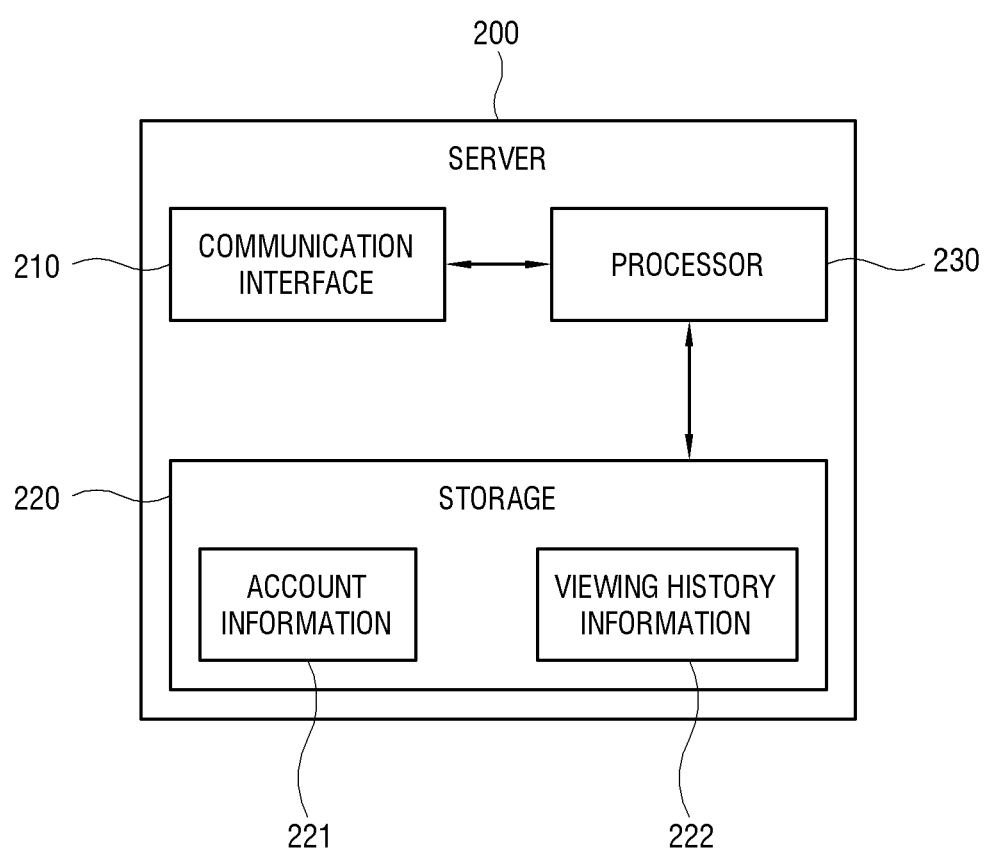
FIG. 3 is a block diagram illustrating a configuration of a server according to the embodiment of the disclosure.

FIG. 3 is a block diagram illustrating a configuration of the server according to the embodiment of the disclosure.

As illustrated in FIG. 3, the server 200 includes a communication interface 210, a storage 220, and a processor 230.

The configuration included in the server 200 is not limited to the above-described embodiment, and may be implemented by excluding or changing some configurations or including additional other configurations. In addition, since the configuration having the same name as the configuration of the display apparatus 100 among the configurations of the server 200 may be implemented in the same form, a duplicate description thereof may be omitted.

The communication interface 210 is provided to be able to communicate with the display apparatus 100 and the external devices such as the terminal apparatuses 301, 302, and 303 through the network 400 in a wired or wireless communication method. The communication interface 120 may be implemented as the circuitry including the wired and/wireless communication module and the communication modules (S/W module, chip, and the like) corresponding to the predetermined communication protocol.

The storage 220 is configured to store various data of the server 200.

According to one embodiment, as illustrated in FIG. 3, each user account information 221 and viewing history information 222 may be stored in the storage 220. The user account information 221 may include security information. In addition, the account information 221 may further include information on the electronic apparatus using the corresponding user account, for example, the display apparatus 100 and the terminal apparatuses 301, 302, and 303.

The processor 230 performs control to operate the overall configurations of the server 200.

According to one embodiment, the processor 230 may receive the viewing history information of the user through the display apparatus 100 and the terminal apparatuses 301, 302, and 303 through the communication interface 210, and extract preferred content based on the viewing history. The processor 230 may transmit the information on the extracted preferred content to devices corresponding to the user account through the communication interface 210, that is, the display apparatus 100 and the terminal apparatuses 301, 302, and 303.

The preferred content transmitted to the display apparatus 100 as described above may be allocated to the second channel among the plurality of channels of the display apparatus 100. The processor 170 of the display apparatus 100 may transmit the information on the content allocated to the second channel to the server 200 to be managed by the server 200.

Further, the processor 230 may receive the channel information on the plurality of channels including the first channel and the second channel from the display apparatus 100 through the communication interface 210, and transmit the channel information to at least one of the terminal apparatuses 301, 302, and 303.

Any one terminal apparatus 301 that has received channel information may allocate or register content played in the terminal apparatus 301 or content corresponding to preferred content information received from the server 200 to or in the second channel among the plurality of channels of the display apparatus 100. The terminal apparatus 301 may transmit the information on the content allocated to the second channel to the server 200 to be managed by the server 200. In addition, as described above, the information on the content allocated to the second channel in the terminal apparatus 301 may be directly transmitted from the terminal apparatus 301 to the display apparatus 100, or may be transmitted to the display apparatus 100 through the server 200. An embodiment related thereto will be described in more detail with reference to FIG. 18.

Figure 4:
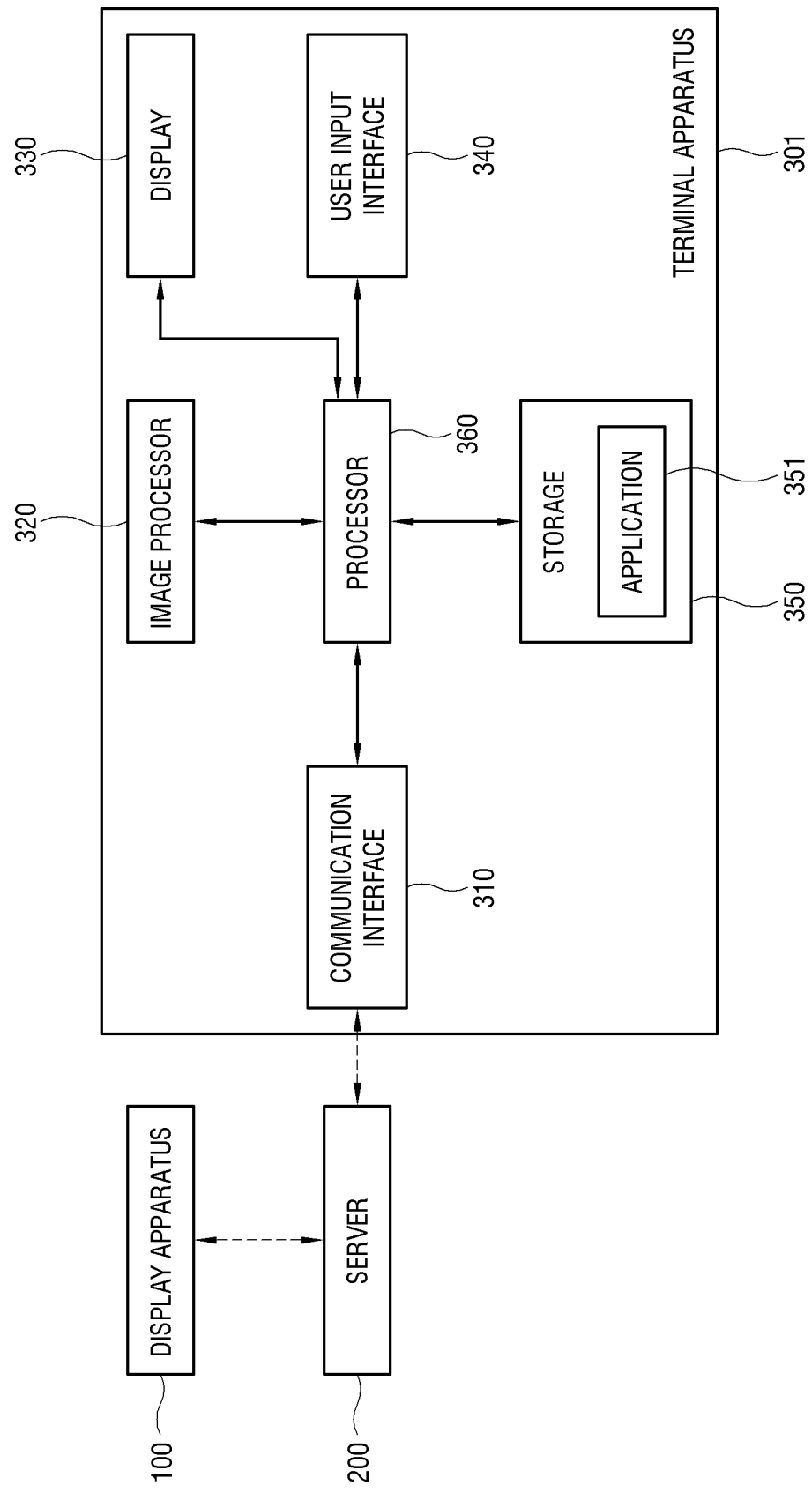
FIG. 4 is a block diagram illustrating a configuration of a terminal apparatus according to the embodiment of the disclosure.

FIG. 4 is a block diagram illustrating a configuration of the terminal apparatus according to the embodiment of the disclosure.

In FIG. 4, the configuration of one terminal apparatus 301 of the terminal apparatuses 301, 302, and 303 of the display system according to the embodiment of the disclosure is illustrated as an example, but the other terminal apparatuses 302 and 303 may be also implemented to include the corresponding components.

As illustrated in FIG. 4, the terminal apparatus 301 includes a communication interface 310, an image processor 320, a display 330, a user input interface 340, a storage 350, and a processor 360.

The configuration included in the terminal apparatus 301 is not limited to the above-described embodiment, and may be implemented by excluding or changing some configurations or including additional other configurations. In addition, since the configuration having the same name as the configuration of the display apparatus 100 among the configurations of the terminal apparatus 301 may be implemented in the same form, a duplicate description thereof may be omitted.

The communication interface 310 is provided to enable communication with an external device including the server 200 using a wired or wireless communication method. The communication interface 310 may be implemented as the circuitry including the wired and/wireless communication module and the communication modules (S/W module, chip, and the like) corresponding to the predetermined communication protocol.

According to one embodiment, the communication interface 310 may further include a mobile communication interface. The mobile communication interface may perform data communication by LTE or the like using one or more antennas under the control of the processor 360. The mobile communication interface transmits and receives wireless signals for a voice call, a video call, a text message (SMS), a multimedia message (MMS), and data communication to and from a mobile phone, a smartphone, a tablet, and the like that have a phone number that can be connected to the terminal apparatus 301.

According to one embodiment, the communication interface 310 may receive various content such as the media file and the web content from the server 200.

The image processor 320 performs various preset processes on the received signal. According to one embodiment, the image processor 320 processes the signal to display the image of the predetermined content based on the signal received from the server 200 through the communication interface 310.

The image processor 320 outputs the generated or combined output signals to the display 330 by performing this process, and as a result, displays an image corresponding to an image signal on the display 330.

The display 330 displays an image corresponding to the signal received from the image processor 320.

The display 330 may include a touch screen capable of detecting a user's touch input.

The display 330 may display an object (for example, menu, text, image, video, figure, icon, shortcut icon, and the like) including a menu item of the terminal apparatus 301 as a user interface (UI). The user may perform the user input by selecting an object displayed on the display 330 with a user's body such as a finger or an input device such as a stylus, a pointing device, or a mouse.

According to one embodiment, the display 330 may display the user interface (UI) including the item (menu item) capable of selecting whether to allocate the virtual channel of the display apparatus 100 for the content of the application received through the communication interface 120. The display 330 may further display a UI including an item capable of selecting the display apparatus to which the virtual channel is to be allocated as described above.

The user input interface 340 transmits various preset control commands or unlimited information to the processor 360 by the user input.

In the terminal apparatus 301 according to one embodiment, the user input interface 340 that includes at least one of a physical button, a keypad displayed on a touch screen, a separate input device (stylus, pointing device, and the like) capable of a user's touch input, an input device (mouse, keyboard, or the like) connectable to the terminal apparatus 301, or a microphone capable of receiving user voice/sound may be defined.

The user input interface 340 may receive a touch by the user's body (for example, finger) on the touch screen. The user input interface 340 transmits the various preset control commands or information to the processor 360 according to the user input including the touch input. According to one embodiment, the user input interface 340 of the terminal apparatus 301 may receive a user's interaction, that is, gesture input for content displayed on the display 330.

The user input interface 340 may include at least one of one or more buttons, a microphone, a keypad, or an input device. In the terminal apparatus 301 according to one embodiment, the button includes a touch button provided on the touch screen as well as the physical button, and the touch button may be displayed as text or an icon in the display 330. The keypad includes at least one of a physical keypad formed on a front surface of the terminal apparatus 301, a virtual keypad displayed on the display 330, and an external keypad (for example, keyboard dock) that can be connected in a wired or wireless manner.

The storage 350 is configured to store various data of the terminal apparatus 301.

According to one embodiment, as illustrated in FIG. 4, at least one application 351 for receiving and playing content provided by the server 200 is installed or stored in the storage 350. The Netflix application and the YouTube application are examples of the application 351 for playing such content.

The application 351 installed described above is executed in the foreground mode in the terminal apparatus 301, so the terminal apparatus 301 may receive and play the media file, the web content, or the like from the server 200 in the real-time streaming manner.

Specifically, the terminal apparatus 301 may receive, from the server 200, content data for content selected by a user from the content provided from the executed application 351, and displays the content image corresponding to the received content.

In the terminal apparatus 301 according to one embodiment, the predetermined user input may be received while the application 351 is executed in the foreground mode to play content.

Here, the received predetermined user input is the user input for switching the application 351, which is executing in the foreground mode, to the background mode, and may include, for example, the user input to stop playing the content being displayed. That is, when a user request to stop playing the content is received as described above, the corresponding application 351 switches the execution state from the foreground mode to the background mode, and the playback of the content of the playing application 351 is stopped, that is, paused.

According to one embodiment, the terminal apparatus 301 allows the operation of allocating the virtual channel to be performed based on the predetermined user input as described above. Specifically, the terminal apparatus 301 may allocate the content of the executed application 351 to the second channel among the plurality of channels of the display apparatus 100 by switching the execution state of the application 351 from the foreground to the background based on the predetermined user input.

Here, the terminal apparatus 301 may determine whether or not the predefined viewing conditions are satisfied based on a user's viewing history of the content being displayed when the operation of allocating the virtual channel is performed, and then may allocate the corresponding content to the second channel when the predefined viewing conditions are satisfied.

For example, when the execution state of the application 351 is switched from the foreground to the background based on the user request to stop playing the currently playing content, the terminal apparatus 301 may determine whether the content of the corresponding application 351 is allocated to or registered in the second channel based on time information associated with the playback of the content of the application 351, for example, a play time of the currently playing content, a remaining time, a ratio of a played time in a total running time, and the like.

The time information related to the playback of the content is not limited. For example, when the play time of the playing content is 30 minutes or more, the remaining time, that is, the remaining play time is less than 5 minutes, or the ratio of the played time in the total running time is 30% or more, it may be determined that the content of the executing application 351 is determined as a channel registration target and allocated to the second channel. Here, a credit time may be excluded from the remaining time.

In another embodiment, the terminal apparatus 301 may allow the operation of allocating the virtual channel to be performed based on the reception of the user selection of the corresponding content while the application 351 is executing, thereby allocating the content of the executed application 351 to the second channel among the plurality of channels.

Specifically, when the terminal apparatus 301 receives the user input to subscribe to the channel of the currently playing content, for example, the YouTube channel while playing the content by executing the application 351 in the foreground mode, the terminal apparatus 301 may allocate or register the content of the corresponding application 351 to or in the second channel.

Meanwhile, the operation of allocating the virtual channel as described above may be performed by the application 351. That is, the terminal apparatus 301 may allow the application 351 to perform the operation of allocating the virtual channel, and allocate the content to the second channel based on the request received from the application 351.

The detailed operation of allocating the channel for the content of the application 351 will be described in more detail in the embodiment of FIG. 18.

The processor 360 performs control to operate the overall configurations of the terminal apparatus 301.

According to one embodiment, the processor 360 executes the application 351 stored in the storage 350 to receive content data for a content selected by the user from the content provided from the executed application from the server 200 through the communication interface 310 and controls the display 330 to display a content image. Here, the processor 360 may allocate the content corresponding to the displayed content image to the second channel among the plurality of channels, on the basis of the execution of the operation of allocating the virtual channel based on the predetermined user input while the content image is displayed.

As one embodiment, the operation of the processor 360 as described above may be implemented as a computer program stored in a computer program product (not illustrated) separately provided from the terminal apparatus 301.

In this case, the computer program product includes a memory in which an instruction corresponding to the computer program is stored, and a processor. When executed by the processor, the instruction includes executing an application to receive, from the server 200, content data for content selected by a user from the content provided from the executed application and to display a content image, and allocating the content corresponding to the displayed content image to the second channel among the plurality of channels of the display apparatus 100 based on the execution of the operation of allocating the virtual channel based on the predetermined user input while the content image is displayed.

As a result, the terminal apparatus 301 may download and execute the computer program stored in the separate computer program product to perform the operation of the processor 170.

Hereinafter, embodiments of allocating content to a virtual channel in the display apparatus according to the disclosure will be described with reference to the drawings.

Figure 5:
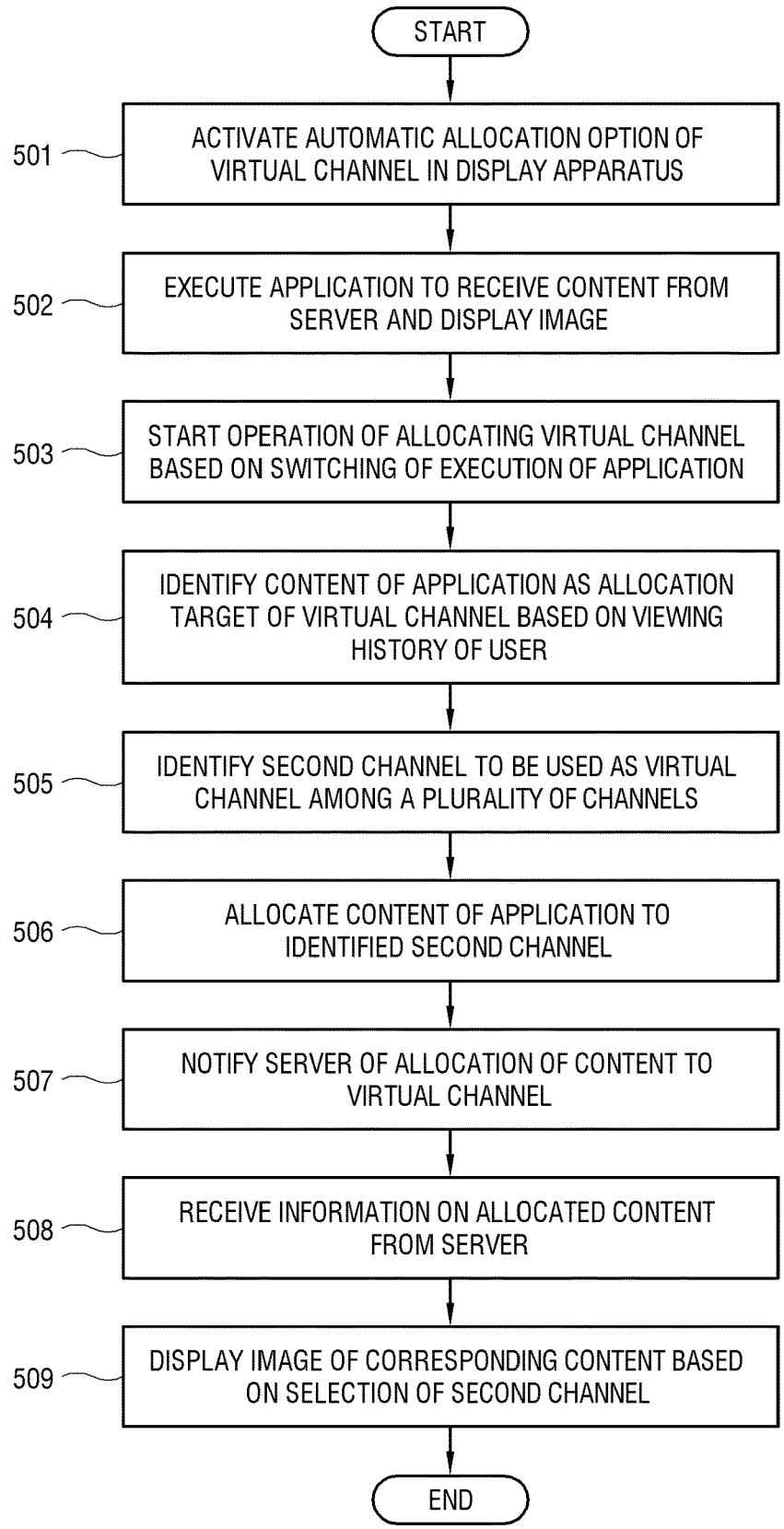
FIG. 5 is a flowchart illustrating a method for controlling a display apparatus according to a first embodiment of the disclosure.

FIG. 5 is a flowchart illustrating a method for controlling a display apparatus according to a first embodiment of the disclosure, and FIGS. 6, 7, 8, 9, and 10 are diagrams illustrating a user interface displayed on the display apparatus according to the first embodiment of FIG. 5.

As illustrated in FIG. 5, the automatic allocation option of the virtual channel may be activated in the display apparatus 100 (step 501).

Figure 6:
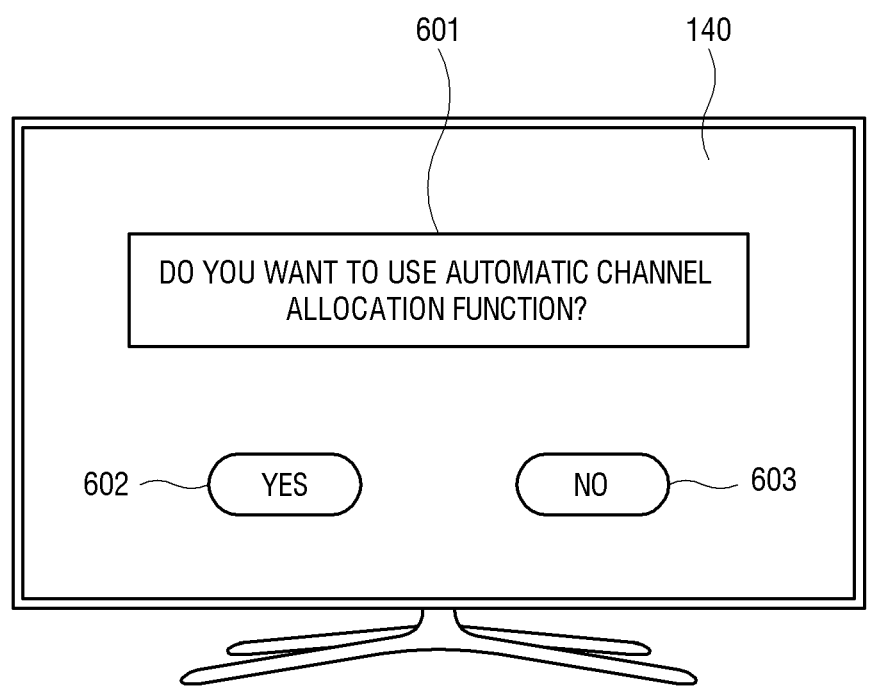
FIGS. 6, 7, 8, 9, and 10 are diagrams illustrating a user interface displayed on the display apparatus according to the first embodiment of FIG. 5.

Specifically, as illustrated in FIG. 6, the processor 170 may control the display 140 to display UIs 601, 602, and 603 that can select whether or not to allocate a virtual channel for content of an application received through the communication interface 120. As illustrated in FIG. 6, the displayed UIs 601, 602, and 603 may include, for example, a message 601 for notifying whether or not to use an automatic channel allocation function of content to the virtual channel of the display apparatus 100, and items 602 and 603 capable of selecting whether to activate or deactivate the automatic channel allocation function.

The processor 170 performs an operation of allocating the virtual channel of the content of the application 161, based on the user input to the displayed items 602 and 603.

In the state in which the automatic allocation option of the virtual channel is activated by the operation of step 501, the processor 170 executes the predetermined application 161 for playing content to receive a signal, that is, content data from the server 200 through the communication interface 120 and to control the display 140 to display an image based on the received signal (step 502).

According to one embodiment, the processor 170 may receive, from the server 200, content data for content selected by a user from the content provided from the executed application 161, and control the display 140 to display the content image corresponding to the received content data in step 502.

Here, the server 200 is an OTT server such as Netflix, and the application 161 is a Netflix application as an example. The processor 170 may receive the content of the media file from the server 200 in the real-time streaming manner while the application 161 is executed in the foreground mode, and display the image of the content on the display 140.

According to one embodiment, the content received in step 502 may include a plurality of sub-content consisting of a series. For example, when the content provided from the server 200 is a series consisting of a plurality of episodes, each of the plurality of episodes may be received from the server 200 to the display apparatus 100 as sub-content.

Based on the switching the execution of the application 161 in step 502, the processor 170 starts an operation of allocating the virtual channel (step 503).

Here, the processor 170 may identify that the application 161 is switched from the foreground mode to the background mode based on a predetermined user input.

The processor 170 may identify the switching of the execution state of the application 161 from the foreground to the background when the user request to stop playing the content through the user input interface 150 is received, for example, while the application 161 is executed in the foreground mode to play content. That is, the received user input may include a user input for switching the application being executed in the foreground mode to the background mode. The processor 170 may control the playback of the currently playing content to be stopped, that is, paused, in response to the received user request.

The processor 170 may identify the content of the application 161 executed in step 502 as an allocation target of the virtual channel based on the switching of the execution of the application 161 in step 503 (step 504).

Here, when the operation of allocating the virtual channel is executed in step 503, the processor 170 may identify content satisfying the predefined viewing conditions as the allocation target of the virtual channel, based on the user's viewing history of the content being displayed in step 502. The predefined viewing conditions may include the play time of the content, the remaining time (remaining play time), the ratio of the played time in the total running time, the characteristics (for example, including a plurality of sub-content consisting of a series) of the content, the number to times in viewing of the content (for example, when a plurality of sub-content consisting of a series, that is, episodes are viewed three or more times, or continuously viewed over two times), and the like, and the viewing conditions are not limited to examples listed above. In addition, the play time of the content and the number of times in viewing of the content may be the sum of the cases in which two or more of the devices registered for the user account are viewed. To this end, the information on the content viewed by the external device, for example, at least one of the terminal apparatuses 301, 302, and 303 may be transmitted from the server 200 to the display apparatus 100.

The processor 170 may receive the information on the viewing history or the viewing conditions from the application 161. The information on the viewing history or the viewing conditions received from the application 161 may be provided from the server 200 to the display apparatus 100, and the information provided from the server 200 may be set by the user input through the display apparatus 100 or the registered external device, for example, the terminal apparatuses 301, 302, and 303 or may be set in advance by the server 200 as a default.

According to one embodiment, the processor 170 may determine whether or not the predefined viewing conditions are satisfied, based on the user's viewing history of the content being displayed, and then identify the content as the allocation target of the virtual channel when the predefined viewing conditions are satisfied, that is, when it is determined that the played content is content that a user will continue to view in the future. For example, when it is determined that the content has a play time of a predetermined time, for example, 30 minutes or more, a remaining time (remaining play time) less than 5 minutes, or a played time of 30% or more in the total running time, and includes a plurality of sub-content consisting of a series in which content consecutive to the content, for example, the next episode exists, the processor 170 may identify the content as the allocation target of the virtual channel.

Here, the case where the content of the application 161 is a VOD, that is, a media file including a plurality of sub-content consisting of a series, is described as an example, but the disclosure is not limited thereto. For example, when the predefined conditions such as in the case where the content of the application 161 is the web content provided by the YouTube channel, the case where each moving image provided by the channel becomes sub-content, the case where a predetermined number or more (for example, three or more) of moving images of the same channel are viewed are satisfied, the web content served by the YouTube channel may be identified as the allocation target of the virtual channel.

If the content is identified as the allocation target of the virtual channel in step 504, the processor 170 identifies the second channel that can be utilized as the virtual channel among the plurality of channels (step 505).

Figure 7:
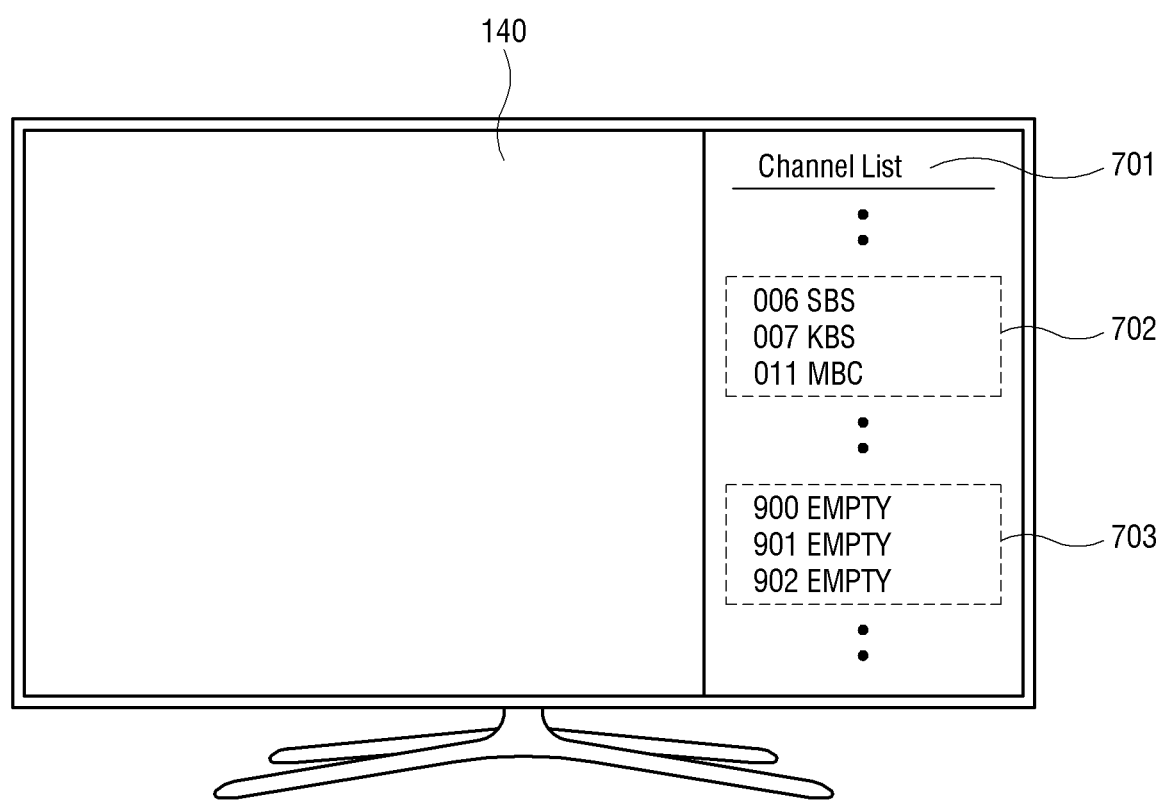

As illustrated in FIG. 7, a channel list 701 related to the plurality of channels of the display apparatus 100 includes a first channel 702 to which a broadcast signal is allocated and a second channel that is an empty channel to which a broadcast signal is not allocated. That is, in the embodiment of FIG. 7, channel Nos. 900 to 1000 may be identified as the second channel.

The processor 170 may allocate the content of the application 161 identified in step 504 to the second channel identified in step 505 (step 506).

Here, the processor 170 may display the UI related to the allocation of the virtual channel on the display 140 and allocate the content of the application 161 to the second channel based on the user input to the displayed UI.

Figure 8:
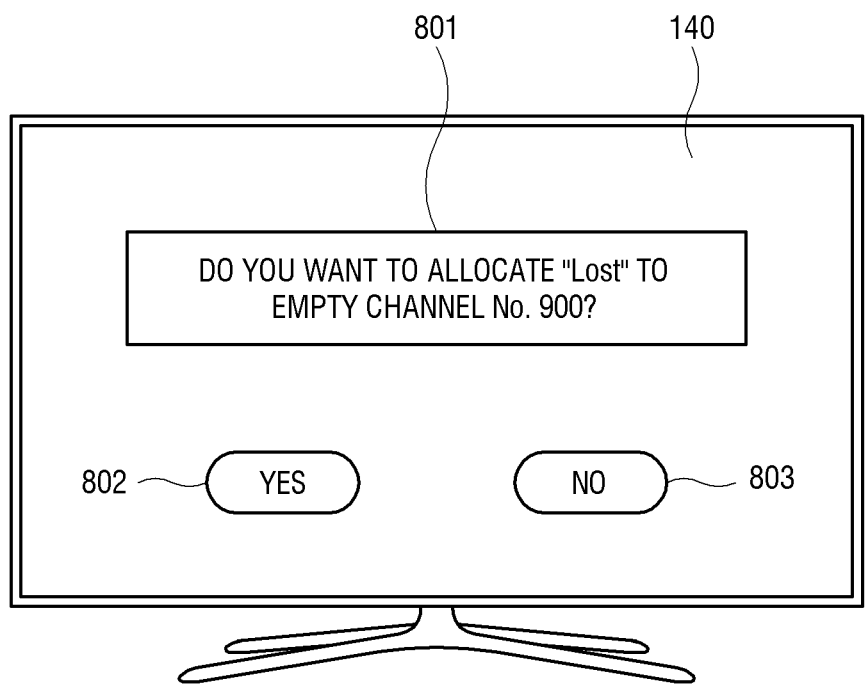

According to one embodiment, as illustrated in FIG. 8, the processor 170 may display on the display 140 a UI that includes a message 801 notifying that the virtual channel can be allocated and items 802 and 803 that can be selected to approve or reject the allocation of the virtual channel in response to the message.

Figure 9:
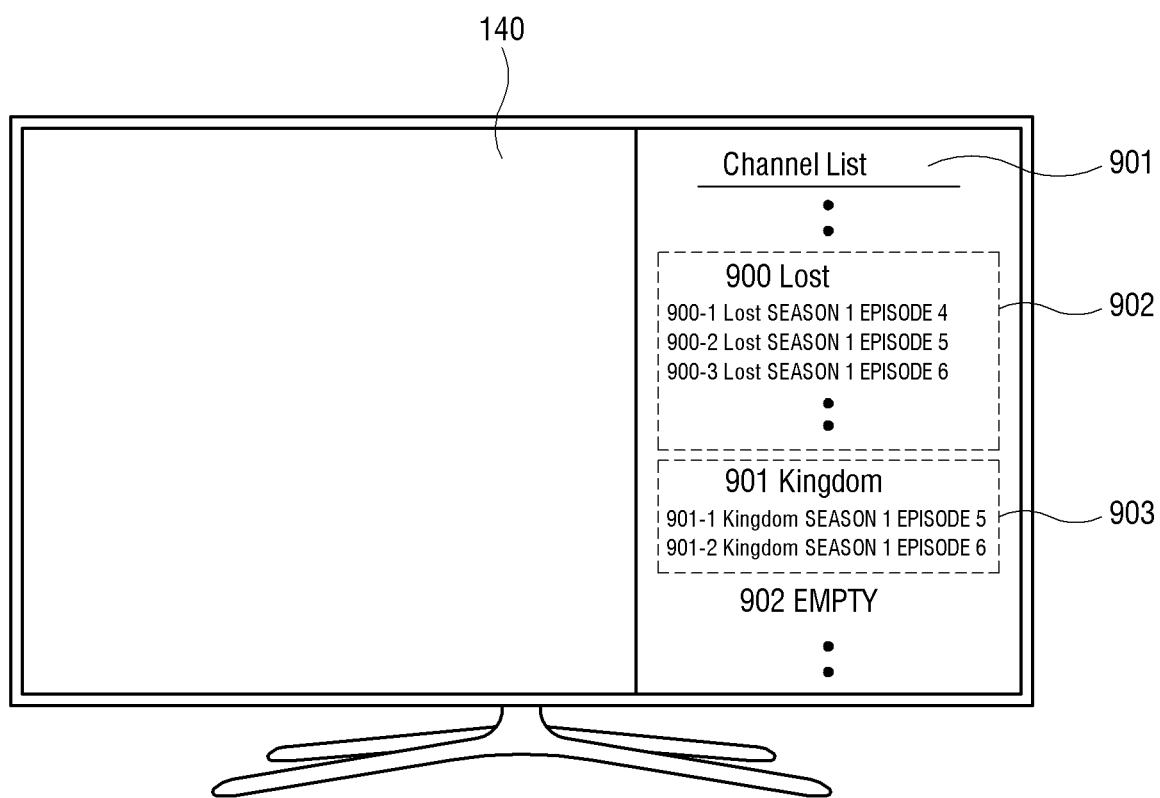

The processor 170 may allocate the content of the executed application 161 to the second channel based on the user input to the displayed items 802 and 803. For example, as illustrated in FIG. 9, "Lost" is allocated to channel No. 900 (902) among second channels of a channel list 901. Here, the "Lost" includes a plurality of sub-content, that is, episodes consisting of a series, so each episode (Season 1 Episode 4, Season 1 Episode 5, and Season 1 Episode 6) may be allocated to sub-channels 900-1, 900-2, and 900-3, respectively.

In the same way, "Kingdom" is allocated to channel No. 901 (903) among the second channels, and each episode (Season 1 Episode 5, Season 1 Episode 6) of "Kingdom" series may be allocated to sub-channels 901-1 and 901-2, respectively.

Figure 10:
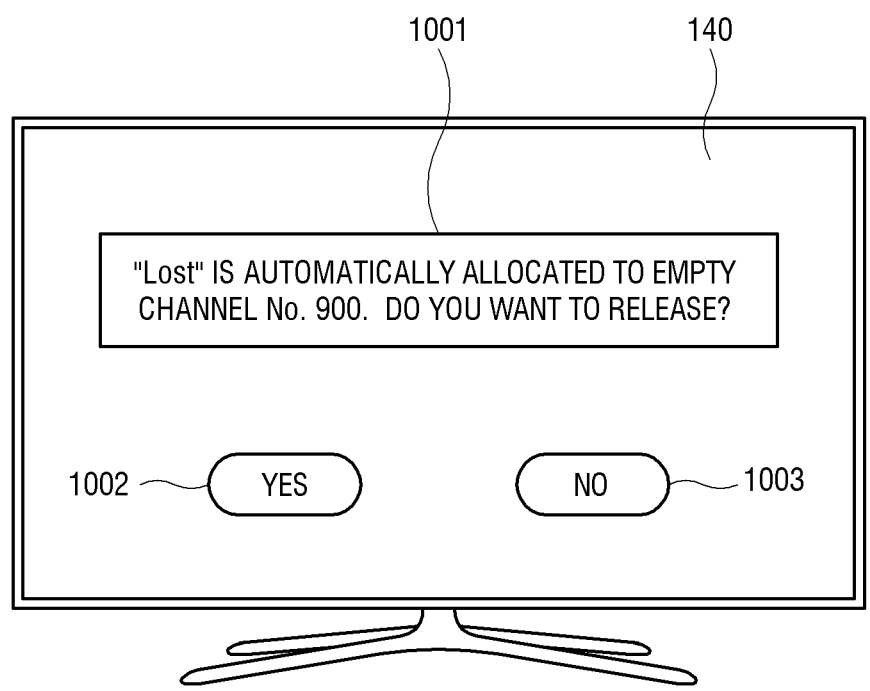

According to another embodiment, the processor 170 may automatically allocate the content of the application 161 to the second channel, and as illustrated in FIG. 10, may display on the display 140 a UI that includes a message 1001 notifying that the virtual channel is allocated and items 1002 and 1003 that can be selected to release or hold the allocation of the virtual channel in response to the message. As illustrated in FIG. 9, the processor 170 may allocate the content of the executed application 161 to the second channel based on the user input to the displayed items 1002 and 1003.

When the content of the application 161 is allocated to the second channel in step 506, the processor 170 may notify the server 200 of the allocation of the content to the virtual channel (step 507). Here, the processor 170 may transmit information, such as a type of content to which the virtual channel is allocated and an allocated second channel number, to the server 200 through the communication interface 120.

The display apparatus 100 may receive the information on the content allocated in step 506 from the server 200 through the communication interface 120 (step 508). That is, the processor 230 of the server 200 may store the received information in the storage 220 based on the reception of the notification in step 507, and control the communication interface 210 to transmit the information on the corresponding content to the display apparatus 100. The information stored in the storage 220 of the server 200 may be shared in, that is, transmitted to other devices of the user, for example, terminal apparatuses 301, 302, and 303.

Here, the information received by the display apparatus 100 may include security information for the display apparatus 100 to access the server 200, for example, a user account, a password, and information on an address, that is, a uniform resource locator (URL) to which the content to which the virtual channel is allocated may be directly downloaded. The processor 170 stores the received information in the storage 160.

In the first embodiment according to the disclosure, according to the operations of steps 503 to 508 as described above, the display apparatus 100 performs the operation of allocating the virtual channel to the content of the application 161.

Further, the processor 170 controls the display 140 to display the image of the content based on the user selection of the second channel to which the content is allocated in step 506 (step 509).

For example, when the user input for selecting the channel No. 900 is received through the user input interface 150, the processor 170 receives a signal of the content "Lost" allocated to the channel No. 900 from the server 200 and controls the display 140 to display the image based on the received signal.

According to one embodiment, in step 509, the processor 170 does not need to set the execution state of the application 161 to the foreground in order to receive the content allocated to the virtual channel, that is, the second channel. That is, in the state in which the content is allocated to the virtual channel, the operation of step 509 that is performed by selecting the second channel, for example, the channel No. 900 may be different from the operation of step 502 described above in that the application 161 is executed without being executed in the foreground mode.

Specifically, the processor 170 may receive the signal of the content from the server 200 based on the information received from the server 200 in step 508, that is, the URL of the content, and the like while the application is being executed in the background. In other words, by using the security information received and stored in step 508, the processor 170 may directly access the URL stored and received in step 508, thereby receiving the signal of the content through the communication interface 120 and controlling the display 140 to display the image based on the received signal.

Accordingly, once the content of the application 161 is allocated to the virtual channel, that is, the second channel, a login process through the user input interface 150 or a process of inputting content to play is not required, and a user may immediately view his/her desired content only by selecting the channel number.

However, the operation of step 509 is not limited to the above-described embodiment, and according to another embodiment, when the second channel to which the content is allocated, for example, the channel No. 900, is selected, the processor 170 may control the application 161 to be switched to the execution in the foreground in order to receive the content allocated to the channel No. 900.

Here, the processor 170 may control the application 161 to be executed/switched in the foreground mode or held in the background mode based on the selection of the second channel to which the content is allocated according to the characteristics of the application 161 corresponding to the content that is the target allocated to the virtual channel.

Figure 11:
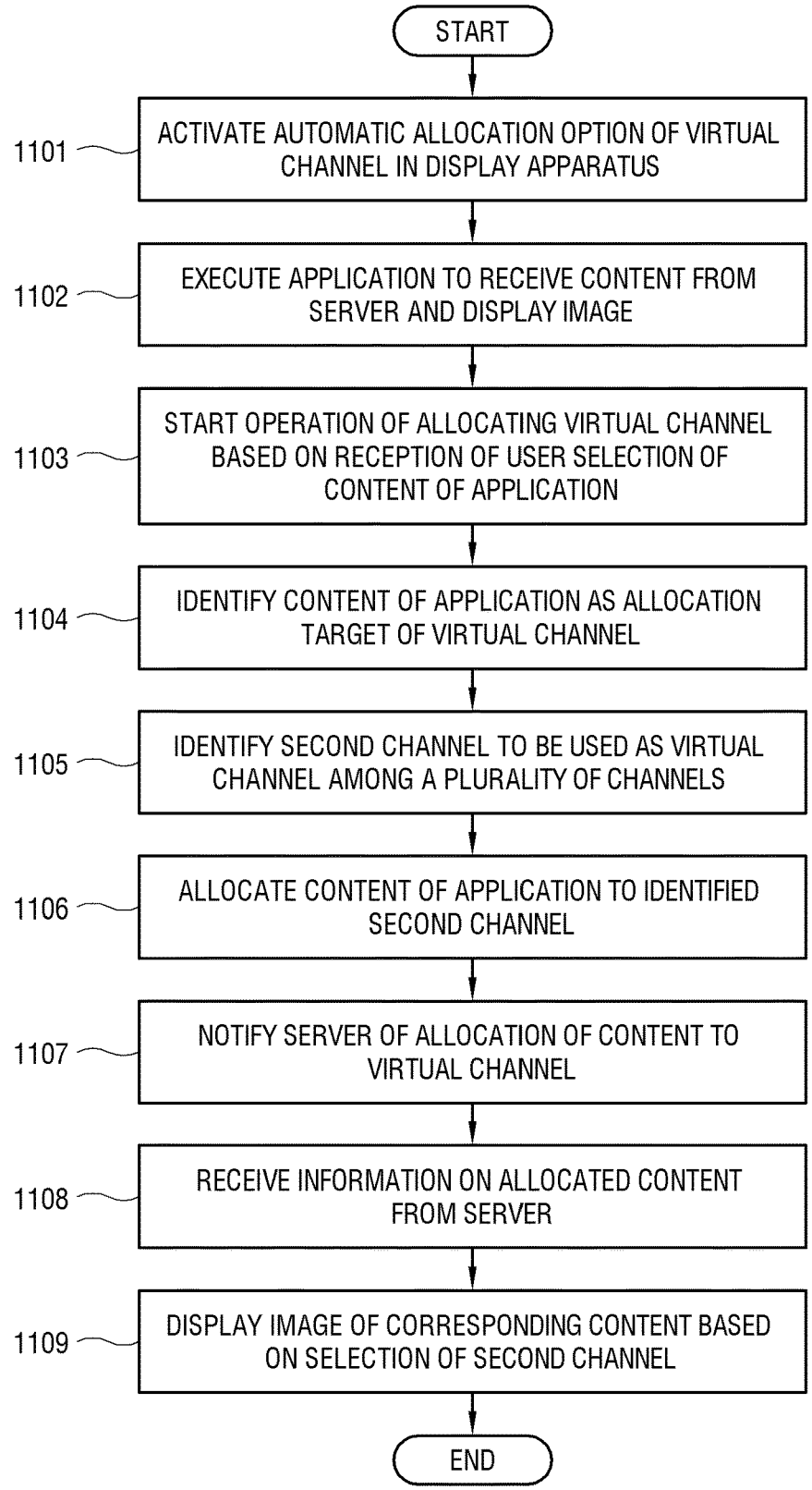
FIG. 11 is a flowchart illustrating a method for controlling a display apparatus according to a second embodiment of the disclosure.
Figure 12:
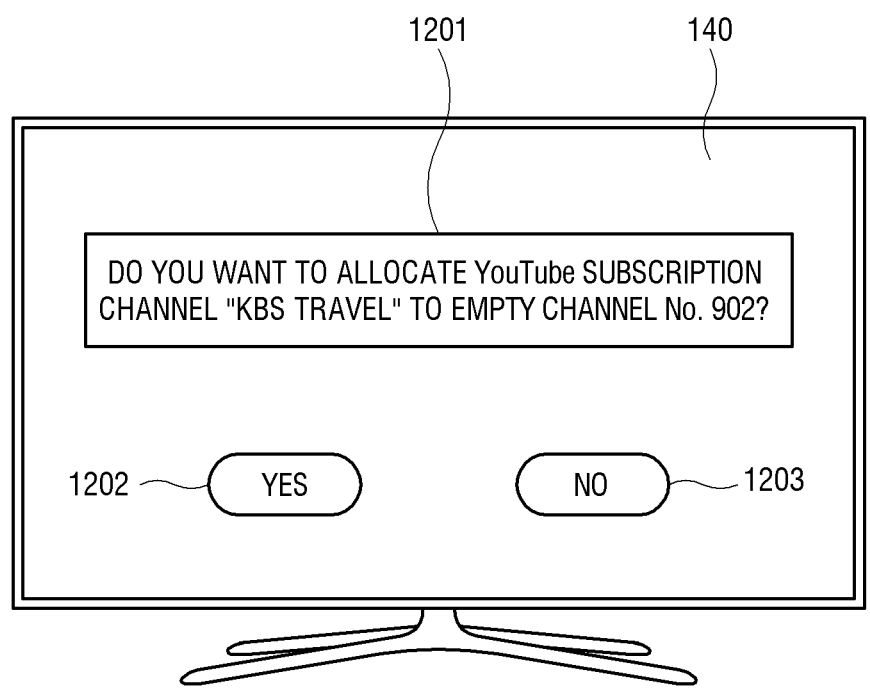
FIGS. 12 and 13 are diagrams illustrating a user interface displayed on the display apparatus according to the second embodiment of FIG. 11.
Figure 13:
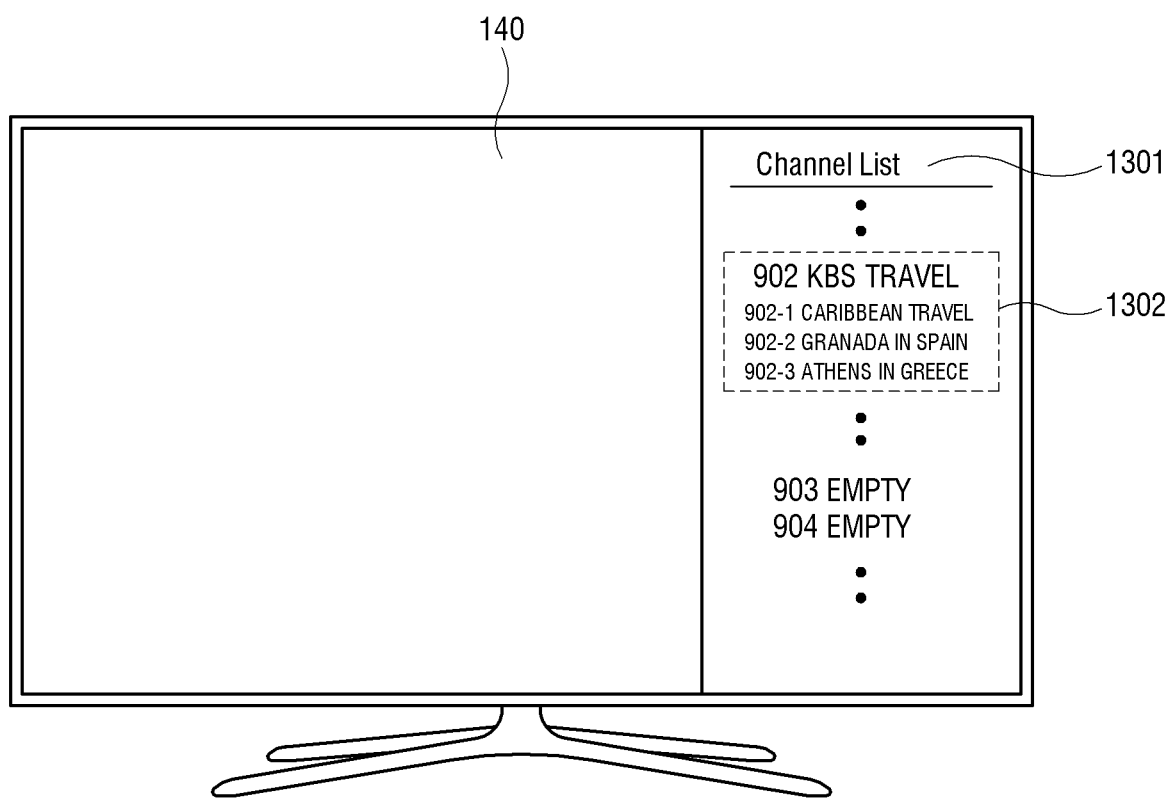

FIG. 11 is a flowchart illustrating a method for controlling a display apparatus according to a second embodiment of the disclosure, and FIGS. 12 and 13 are diagrams illustrating a user interface displayed on the display apparatus according to the second embodiment of FIG. 11.

As illustrated in FIG. 11, the automatic allocation option of the virtual channel may be activated in the display apparatus 100 (step 1101). The activation of the automatic allocation option of the virtual channel in step 1101 may be performed in the same manner, for example, as receiving a user input to displayed items 602 and 603 in FIG. 6, which is described in step 501 of FIG. 5.

In the state in which the automatic allocation option of the virtual channel is activated by the operation of step 1101, the processor 170 executes the predetermined application 161 for playing content to receive a signal, that is, content from the server 200 through the communication interface 120 and to control the display 140 to display an image based on the received signal (step 1102).

Here, the server 200 is a web server such as YouTube, and the application 161 is a YouTube application as an example. The processor 170 may receive the web content from the server 200 in the real-time streaming manner while the application 161 is executed in the foreground mode, and display the image of the web content on the display 140.

According to one embodiment, the content received in step 1102 may include a plurality of sub-content consisting of a series. That is, when the content provided from the server 200 is content of the YouTube channel, each of the plurality of moving images served from the channel may be received from the server 200 to the display apparatus 100 as sub-content.

Based on the reception of the user selection of the displayed content of the application 161 in step 1102, the processor 170 starts an operation of allocating the virtual channel (1103).

Here, the processor 170 may identify that the user selection of the content of the application 161, for example, a user selection to subscribe to a predetermined YouTube channel is received through the user input interface 150.

The processor 170 may identify the content of the application 161 executed in step 1102 as an allocation target of the virtual channel based on the reception of the user selection of the content of the application 161 in step 1103 (step 1104).

Here, the processor 170 may identify content that satisfies the predefined viewing conditions as the allocation target of the virtual channel. The predefined viewing conditions may include characteristics (for example, including a plurality of sub-content as the web content served through the YouTube channel) for determining whether the played content is content that the user will continue to view in the future, and the viewing conditions are not limited to the above example.

If the content is identified as the allocation target of the virtual channel in step 1104, the processor 170 identifies the second channel that can be utilized as the virtual channel among the plurality of channels (step 1105).

The channel list 701 for the plurality of channels of the display apparatus 100 includes the first channel 702 to which the broadcast signal is allocated and the second channel that is an empty channel to which the broadcast signal is not allocated, as illustrated in FIG. 7, and according to one embodiment of FIG. 7, channel number Nos. 900 to 1000 may be identified as the second channel.

The processor 170 may allocate the content of the application 161 identified in step 1104 to the second channel identified in step 1105 (step 1106).

Here, the processor 170 may display the UI related to the allocation of the virtual channel on the display 140 and allocate the content of the application 161 to the second channel based on the user input to the displayed UI.

According to one embodiment, as illustrated in FIG. 12, the processor 170 may display on the display 140 a UI that includes a message 1201 notifying that the virtual channel can be allocated and items 1202 and 1203 that can be selected to approve or reject the allocation of the virtual channel in response to the message.

The processor 170 may allocate the content of the executed application 161 to the second channel based on the user input to the displayed items 1202 and 1203. For example, as illustrated in FIG. 13, YouTube subscription channel "KBS TRAVEL" is allocated to channel No. 902 (1302) among second channels of a channel list 1301. Here, the "KBS TRAVEL" channel provides a plurality of sub-content consisting of a series, so each sub-content (Caribbean Travel, Granada in Spain, Athens in Greece) may be allocated to sub-channels 902-1, 902-2, and 902-3, respectively.

According to another embodiment, the processor 170 may automatically allocate the content of the application 161, for example, the YouTube subscription channel "KBS TRAVEL" to the second channel, and may display on the display 140 a UI that includes a message notifying that the virtual channel is allocated and an item that can be selected to release or hold the allocation of the virtual channel in response to the message. As illustrated in FIG. 12, the processor 170 may allocate the content of the executed application 161 to the second channel based on the user input to the displayed items.

When the content of the application 161 is allocated to the second channel in step 1106, the processor 170 may notify the server 200 of the allocation of the content to the virtual channel (step 1107). Here, the processor 170 may transmit information, such as a type of content to which the virtual channel is allocated and an allocated second channel number, to the server 200 through the communication interface 120.

The display apparatus 100 may receive the information on the content allocated in step 1106 from the server 200 through the communication interface 120 (step 1108). That is, the processor 230 of the server 200 may store the received information in the storage 220 based on the reception of the notification in step 1107, and control the communication interface 210 to transmit the information on the corresponding content to the display apparatus 100. The information stored in the storage 220 of the server 200 may be shared in, that is, transmitted to other devices of the user, for example, terminal apparatuses 301, 302, and 303.

Here, the information received by the display apparatus 100 may include security information for the display apparatus 100 to access the server 200, for example, a user account, a password, and information on an address, that is, a uniform resource locator (URL) to which the content to which the virtual channel is allocated may be directly downloaded. The processor 170 stores the received information in the storage 160.

In the second embodiment according to the disclosure, according to the operations of steps 1103 to 1108 as described above, the display apparatus 100 performs the operation of allocating the virtual channel to the content of the application 161.

Further, the processor 170 controls the display 140 to display the image of the content based on the user selection of the second channel to which the content is allocated in step 1106 (step 1109).

For example, when the user input for selecting the channel No. 902 is received through the user input interface 150, the processor 170 receives a signal of the YouTube channel "KBS TRAVEL" of the content allocated to the channel No. 902 from the server 200 and controls the display 140 to display the image based on the received signal.

Here, the processor 170 may receive the signal of the content from the server 200 based on the information received from the server 200 in step 1108, that is, the URL of the content, and the like. That is, by using the security information received and stored in step 1108, the processor 170 may directly access the URL stored and received in step 1108, thereby receiving the signal of the content through the communication interface 120 and controlling the display 140 to display the image based on the received signal.

Accordingly, once the content of the application 161 is allocated to the virtual channel, that is, the second channel, a login process through the user input interface 150 or a process of inputting content to play is not required, and a user may immediately view his/her desired content only by selecting the channel number.

Figure 14:
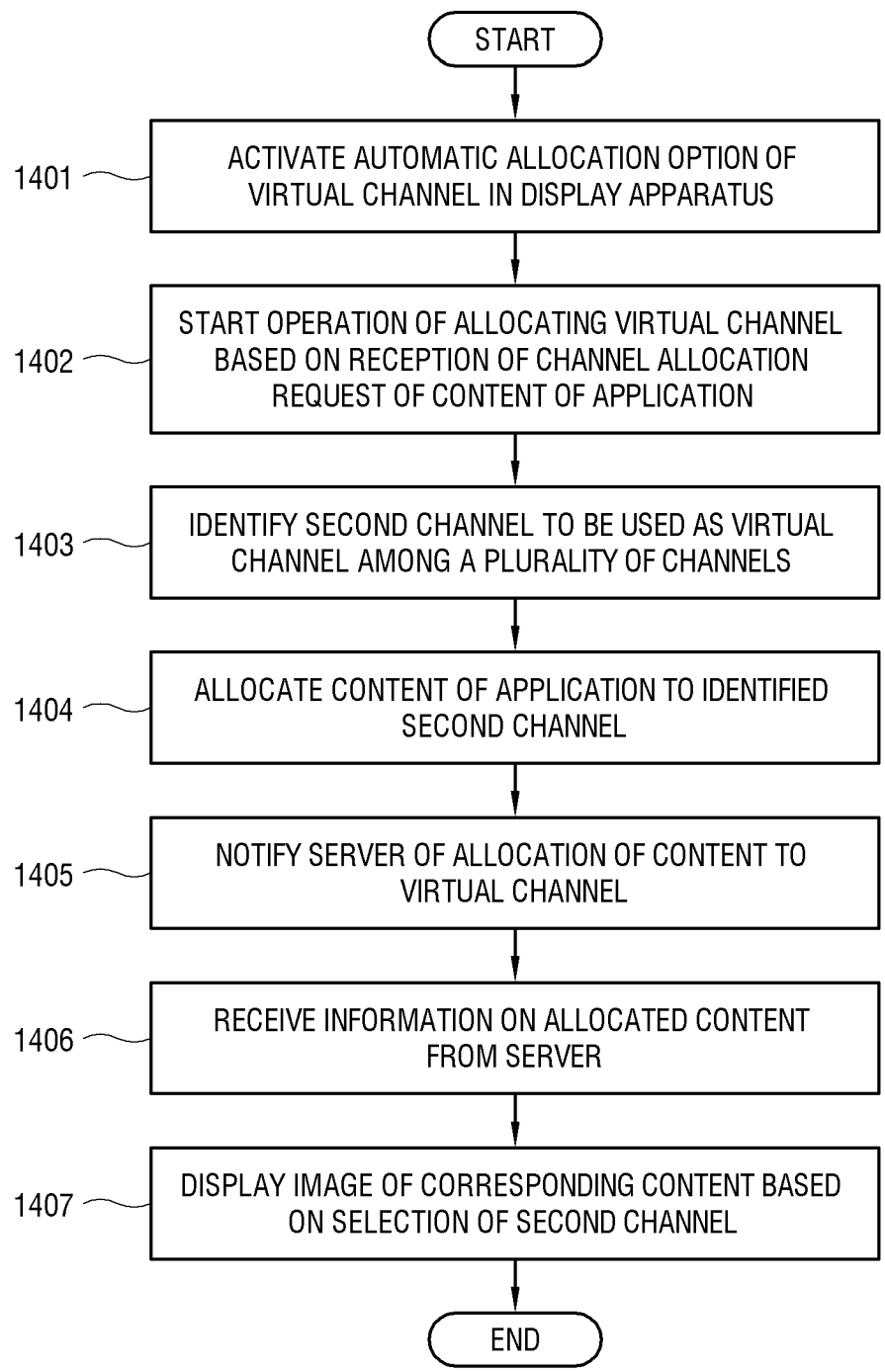
FIG. 14 is a flowchart illustrating a method for controlling a display apparatus according to a third embodiment of the disclosure.
Figure 15:
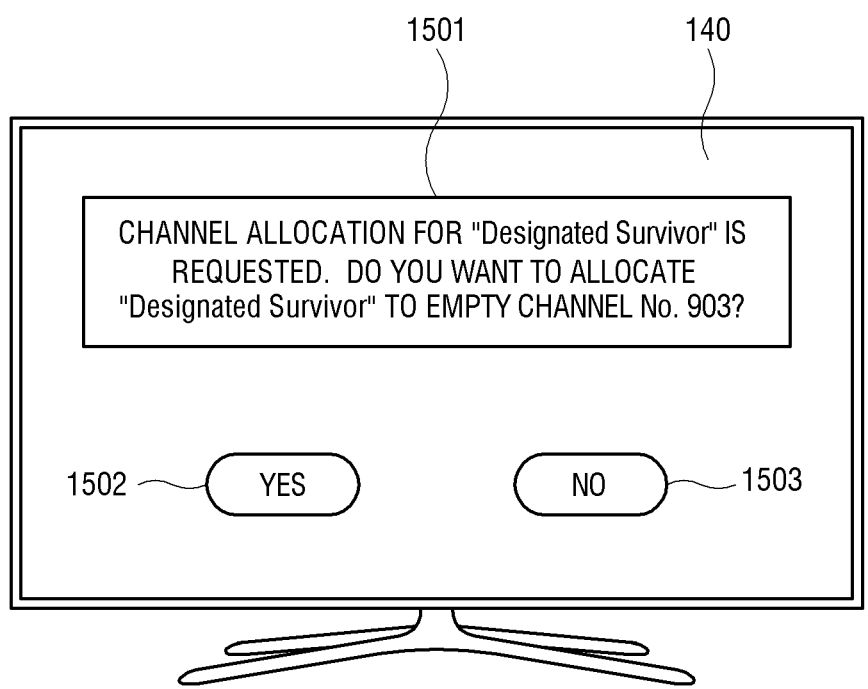
FIG. 15 is a diagram illustrating a user interface displayed on the display apparatus according to the third embodiment of FIG. 14.

FIG. 14 is a flowchart illustrating a method for controlling a display apparatus according to a third embodiment of the disclosure, and FIG. 15 is a diagram illustrating a user interface displayed on the display apparatus according to the third embodiment of FIG. 14.

As illustrated in FIG. 14, the automatic allocation option of the virtual channel may be activated in the display apparatus 100 (step 1401). The activation of the automatic allocation option of the virtual channel in step 1401 may be performed in the same manner, for example, as receiving a user input to displayed items 602 and 603 in FIG. 6, which is described in step 501 of FIG. 5.

In the state in which the automatic allocation option of the virtual channel is activated by the operation of step 1401, the processor 170 initiates an operation of allocating the virtual channel based on the reception of a channel allocation request for the content of the application 161 (step 1402). In response to a channel allocation request from the application 161, the processor 170 may initiate the operation of allocating the virtual channel in response to the request by executing a TV application.

The processor 170 may receive the channel allocation request from the application 161 for playing content, for example, a Netflix application or a YouTube application, and the channel allocation request may be received from the corresponding server 200, for example, a Netflix server or a YouTube server. The processor 230 of the server 200 may control the communication interface 210 to transmit the channel allocation request to the display apparatus 100 when the viewing history of the application 161 or a predefined viewing conditions are satisfied.

According to one embodiment, when it is determined that the content of the application 161 is viewed for a predetermined time, for example, 30 minutes or more in the other device of the user registered in the storage 220 of the server 200, for example, the terminal apparatus 301, has the remaining time (remaining play time) less than a predetermined time, for example, 5 minutes, or a played time of a predetermined ratio or more, for example, 30% or more in the total running time, and includes a plurality of sub-content consisting of a series in which content consecutive to the viewed content, for example, the next episode/moving image exists, the processor 230 of the server 200 may control the communication interface 210 to transmit the channel allocation request to the display apparatus 100.

According to another embodiment, when the other device of the user registered in the storage 220 of the server 200, for example, the terminal apparatus 301 notifies the server 200 that a user selection of the content of the application 161, for example, a user input to subscribe to a predetermined YouTube channel is received through the user input interface 340, the processor 230 of the server 200 may control the communication interface 210 to transmit the channel allocation request to the display apparatus 100.

According to another embodiment, the processor 230 of the server 200 may identify the user's preferred content based on the user's viewing history, and control the communication interface 210 to transmit the channel allocation request for the identified preferred content to the display apparatus 100. The identified preferred content may include content searched by a user, content selected by clicking or the like, content of a genre similar to content viewed by a user, content selected or viewed by other users who view the same content as the content viewed by the user, content viewed or recommended by other users (sub-account/account registered as a friend) linked to a user account, and the like.

The processor 170 identifies the second channel that can be used as the virtual channel among the plurality of channels based on the reception of the channel allocation request for the content of the application 161 in step 1402 (step 1403).

The channel list 701 for the plurality of channels of the display apparatus 100 includes the first channel 702 to which the broadcast signal is allocated and the second channel that is an empty channel to which the broadcast signal is not allocated, as illustrated in FIG. 7, and according to one embodiment of FIG. 7, the channel number Nos. 900 to 1000 may be identified as the second channel.

The processor 170 may allocate the content of the application 161 requested in step 1402 to the second channel identified in step 1403 (step 1404).

Here, the processor 170 may display the UI related to the allocation of the virtual channel on the display 140 and allocate the content of the application 161 to the second channel based on the user input to the displayed UI.

According to one embodiment, as illustrated in FIG. 15, the processor 170 may display on the display 140 a UI that includes a message 1501 notifying that the allocation of the virtual channel is requested and items 1502 and 1503 that can be selected to approve or reject the allocation of the virtual channel in response to the message.

The processor 170 may allocate the content of the requested application 161 to the second channel based on the user input to the displayed items 1502 and 1503. For example, "Designated Survivor" is allocated to channel No. 903 among the second channels of the channel list 1301. Here, the "Designated Survivor" includes a plurality of sub-content, that is, episodes consisting of a series, so each episode (for example, Season 1 Episode 4, Season 1 Episode 5, and Season 1 Episode 6) may be allocated to sub-channels 903-1, 903-2, and 903-3, respectively.

According to another embodiment, the processor 170 may automatically allocate the content of the application 161, for example, the "Designated Survivor" to the second channel, and may display on the display 140 a UI that includes a message notifying that the virtual channel is allocated and an item that can be selected to release or hold the allocation of the virtual channel in response to the message. The processor 170 may allocate the content of the application 161 in which the request is received to the second channel based on the user input to the displayed items.

When the content of the application 161 is allocated to the second channel in step 1404, the processor 170 may notify the server 200 that the content is allocated to the virtual channel (step 1405). Here, the processor 170 may transmit the information, such as a second channel number allocated to the content in which the request is received, to the server 200 through the communication interface 120.

The display apparatus 100 may receive the information on the content allocated in step 1106 from the server 200 through the communication interface 120 (step 1108). That is, the processor 230 of the server 200 may store the received information in the storage 220 based on the reception of the notification in step 1107, and control the communication interface 210 to transmit the information on the corresponding content to the display apparatus 100. The information stored in the storage 220 of the server 200 may be shared in, that is, transmitted to other devices of the user, for example, terminal apparatuses 301, 302, and 303.

Here, the information received by the display apparatus 100 may include security information for the display apparatus 100 to access the server 200, for example, a user account, a password, and information on an address, that is, a uniform resource locator (URL) to which the content to which the virtual channel is allocated may be directly downloaded. The processor 170 stores the received information in the storage 160.

According to another embodiment, the information received in step 1406 may be received from the server 200 to the display apparatus 100 together with the channel allocation request in step 1402. In this case, the operation of step 1406 may be omitted.

In the third embodiment according to the disclosure, according to the operations of steps 1402 to 1406 as described above, the display apparatus 100 performs the operation of allocating the virtual channel to the content of the application 161.

Further, the processor 170 controls the display 140 to display the image of the content based on the user selection of the second channel to which the content is allocated in step 1404 (step 1407).

For example, when the user input for selecting the channel No. 902 is received through the user input interface 150, the processor 170 receives a signal of the YouTube channel "KBS TRAVEL" of the content allocated to the channel No. 902 from the server 200 and controls the display 140 to display the image based on the received signal.

Here, the processor 170 may receive the signal of the content from the server 200 based on the information received from the server 200 in step 1406 or step 1402, that is, the URL of the content, and the like. That is, by using the security information received and stored in advance, the processor 170 may directly access the URL stored and received in advance, thereby receiving the signal of the content through the communication interface 120 and controlling the display 140 to display the image based on the received signal.

Accordingly, once the content of the application 161 is allocated to the virtual channel, that is, the second channel, a login process through the user input interface 150 or a process of inputting content to play is not required, and a user may immediately view his/her desired content only when selecting the channel number.

Figure 16:
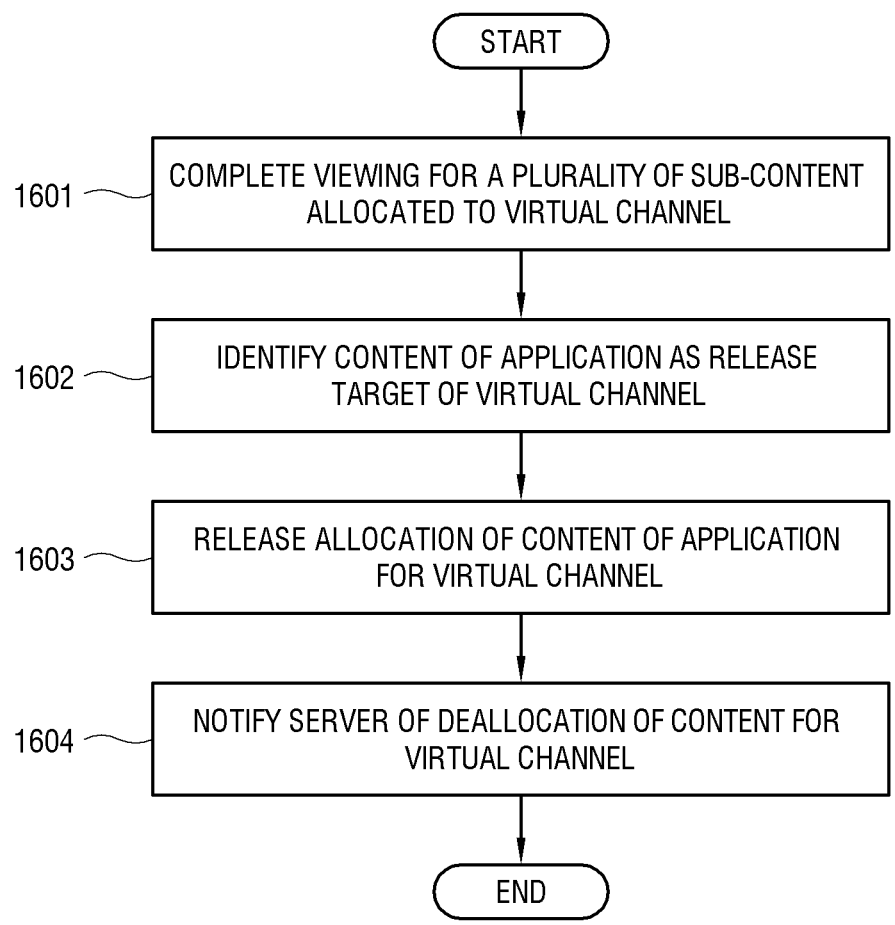
FIG. 16 is a flowchart illustrating a method for controlling a display apparatus according to a fourth embodiment of the disclosure.
Figure 17:
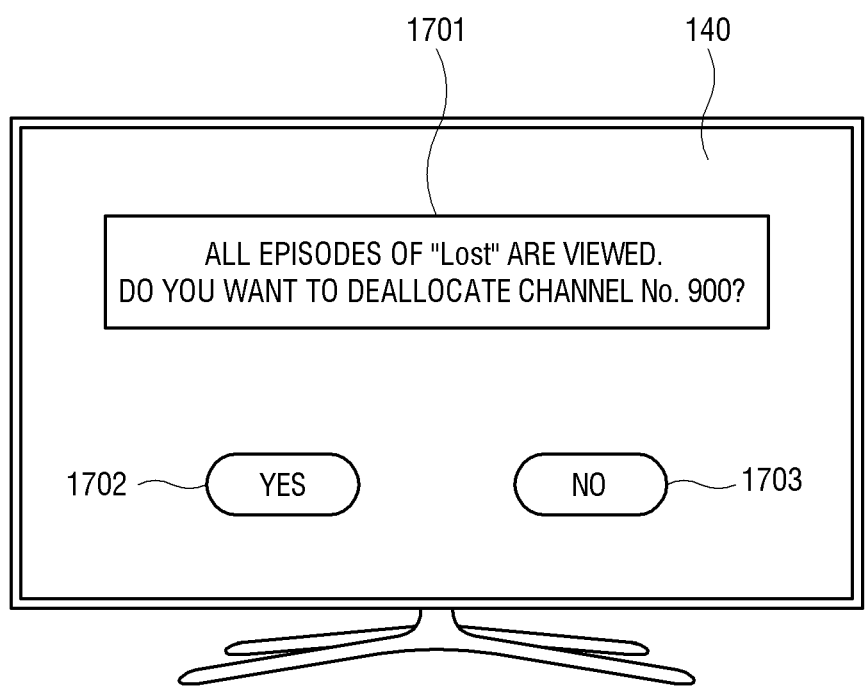
FIG. 17 is a diagram illustrating a user interface displayed on the display apparatus according to the fourth embodiment of FIG. 16.

FIG. 16 is a flowchart illustrating a method for controlling a display apparatus according to a fourth embodiment of the disclosure, and FIG. 17 is a diagram illustrating a user interface displayed on the display apparatus according to the fourth embodiment of FIG. 16.

According to the first to third embodiments described above, the display apparatus 100 may display the image of the corresponding content as described in steps 509, 1109, and 1407 based on the user input that selects the second channel, which is the virtual channel to which the content of the application 161 is allocated, for example, any one of channel numbers 900, 901, 902, and 903, thereby allowing the user to sequentially the content, for example, the plurality of sub-content.

As illustrated in FIG. 16, the processor 170 may identify that the viewing, that is, the playback of the plurality of sub-content allocated to the virtual channel, that is, the second channel is completed (step 1601).

The processor 170 may identify the content of the application 161 as a release target of the virtual channel based on the completion of viewing of the plurality of sub-content in step 1601 (step 1602). For example, as illustrated in FIG. 9, when all sub-content of the "Lost" allocated to the channel number 900, that is, all episodes of the previous season are completely viewed, the processor 170 may identify the "Lost" as the release target of the virtual channel.

According to one embodiment, the completion of viewing of the plurality of sub-content may include viewing using the display apparatus 100 and viewing using the external device registered for the user, for example, the terminal apparatus 301. The viewing history using each of the devices may be transmitted to the server 200 and may be integrated and managed by the server 200.

Then, the processor 170 may release the allocation of the content of the application 161 identified in step 1602 to the second channel (step 1603).

Here, the processor 170 may display the UI related to the allocation of the virtual channel on the display 140 and release the content of the application 161 from the allocation of the second channel based on the user input to the displayed UI.

According to one embodiment, as illustrated in FIG. 17, the processor 170 may display on the display 140 a UI that includes a message 1701 notifying that the allocation of the virtual channel can be released and items 1702 and 1703 that can be selected to approve or reject the release of the virtual channel in response to the message.

The processor 170 may release the allocation of the content to the second channel based on the user input to the displayed items 1702 and 1703. For example, as illustrated in FIG. 9, the allocation of the channel No. 900 to the "Lost" allocated to the channel No. 900 (902) among the second channels may be released. Since the channel No. 900 that is deallocated is the empty channel, other content may be allocated later.

Accordingly, since the display apparatus 100 having the limited number of channels can continuously allocate content to the virtual channel, the user can easily and conveniently view the content of the application 161 without limitation.

When the allocation of the content of the application 161 to the second channel is released in step 1603, the processor 170 may notify the server 200 that the allocation of the content to the virtual channel is released (step 1604). Here, the processor 170 may transmit information, such as a type of content to which the virtual channel is allocated and a deallocated second channel number, to the server 200 through the communication interface 120.

Figure 18:
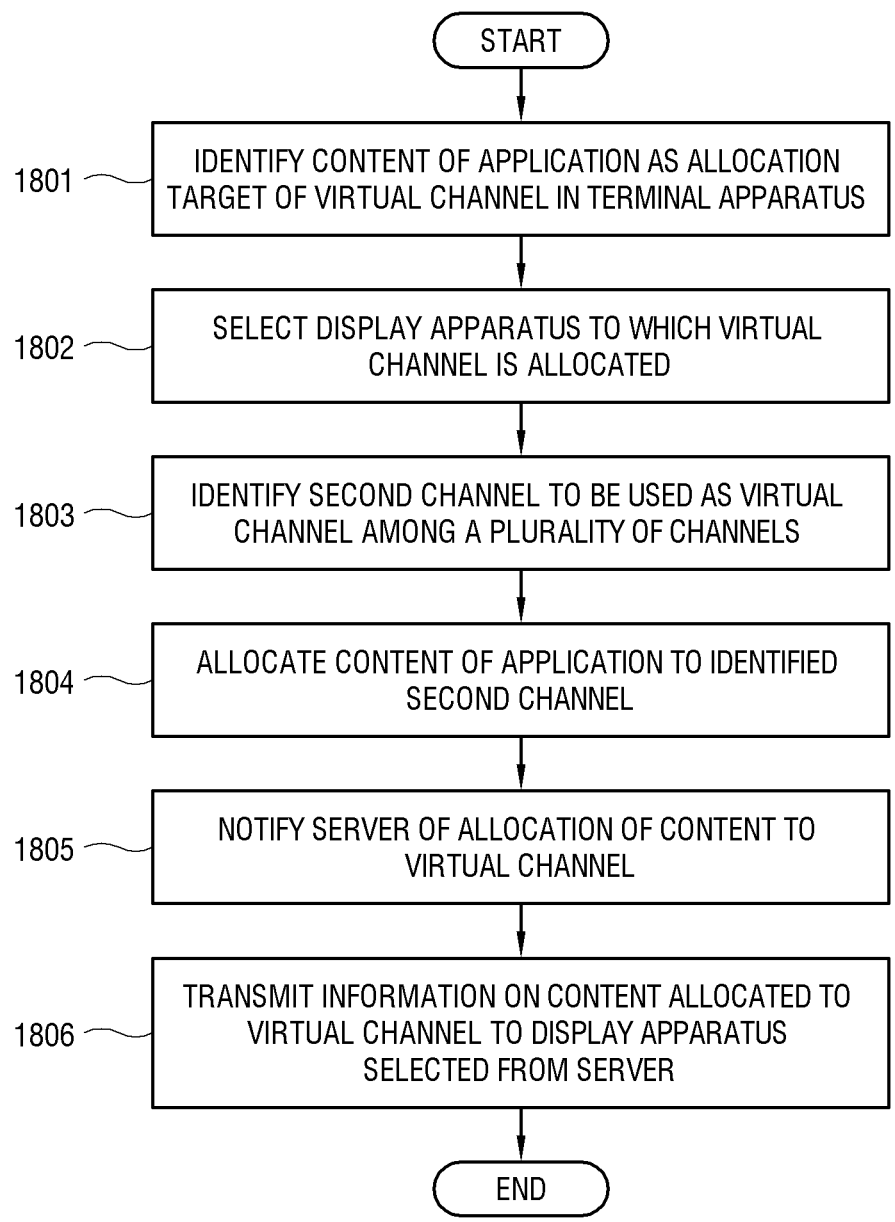
FIG. 18 is a flowchart illustrating a method for controlling a terminal apparatus according to an embodiment of the disclosure.
Figure 19:
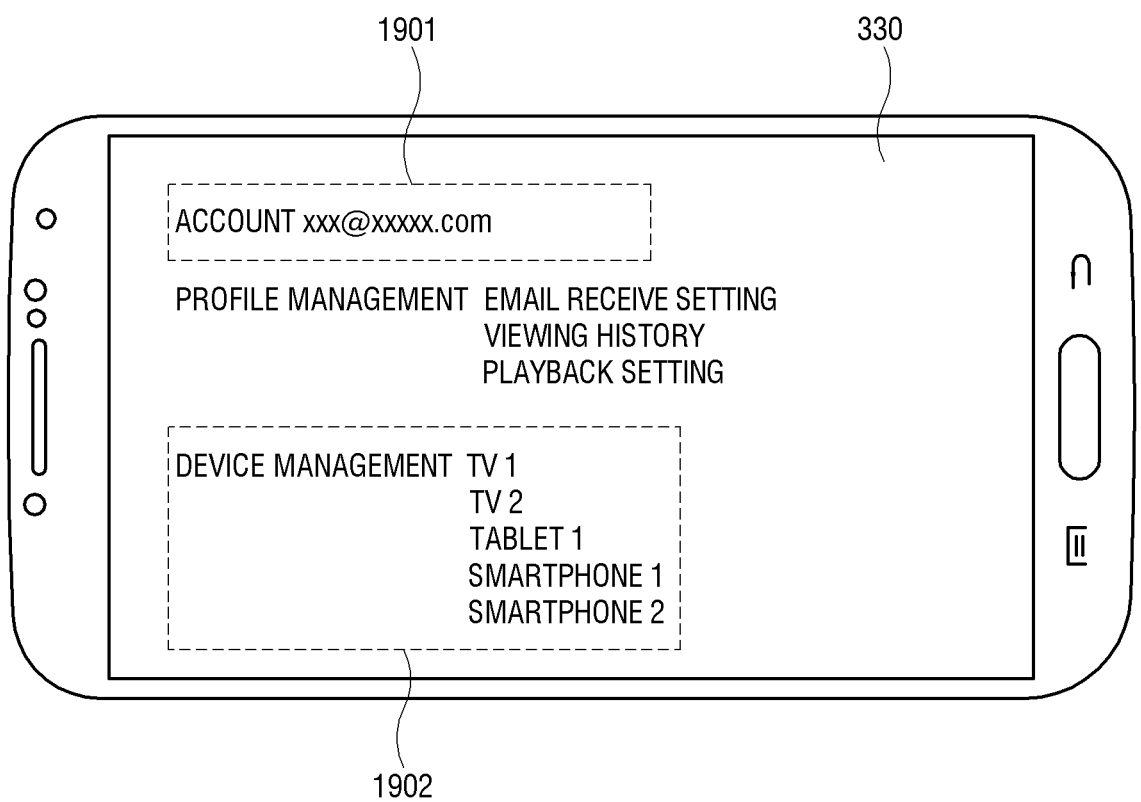
FIGS. 19 and 20 are diagrams illustrating a user interface displayed on a terminal apparatus according to an embodiment of FIG. 18.
Figure 20:
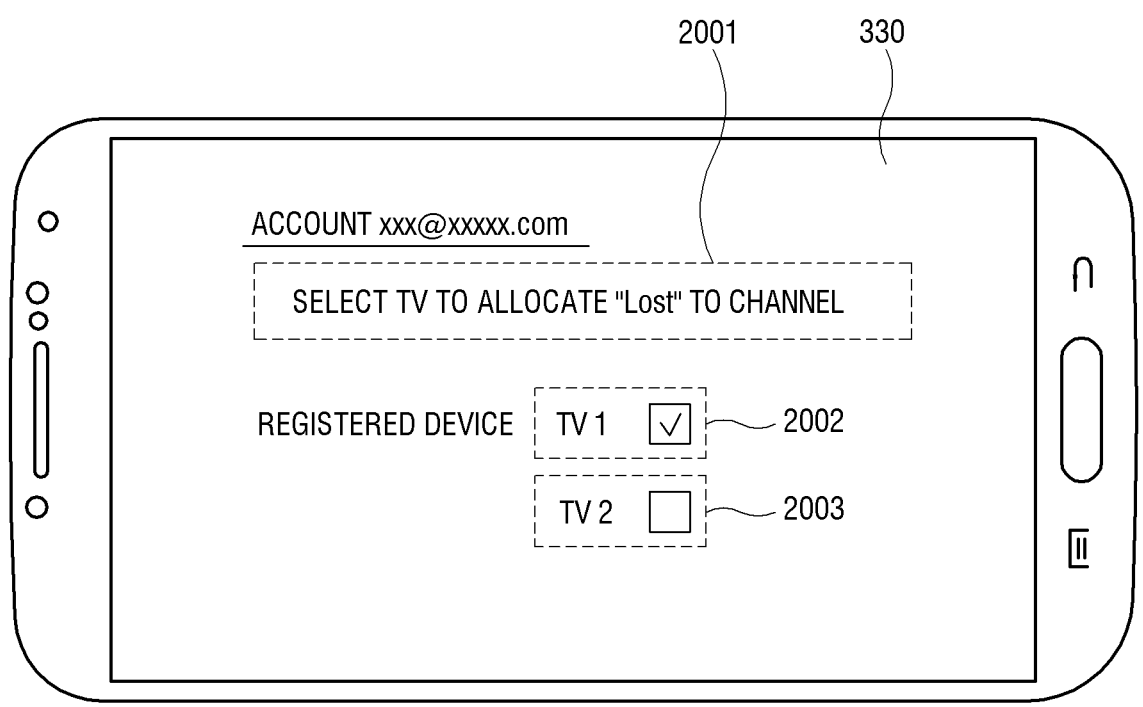

FIG. 18 is a flowchart illustrating a method for controlling a terminal apparatus according to an embodiment of the disclosure, and FIGS. 19 and 20 are diagrams illustrating a user interface displayed on the terminal apparatus according to the embodiment of FIG. 18.

FIG. 18 illustrates an embodiment in which the allocation of the content of the application 161 to the virtual channel, that is, the second channel among the plurality of channels of the display apparatus 100 is performed in any one of the external devices 300 of the display apparatus 100, for example, the terminal apparatus 301.

As illustrated in FIG. 18, the terminal apparatus 301 may identify the content of the application 161 as the allocation target of the virtual channel (step 1801).

According to one embodiment, the processor 360 of the terminal apparatus 301 may identify the content satisfying the predefined viewing conditions as the allocation target of the virtual channel based on the user's viewing history in the devices registered for the user account, such as the display apparatus 100 and the terminal apparatuses 301, 302, and 303. The user's viewing history may be stored and managed by the server 200 and may be transmitted to the terminal apparatus 301.

According to another embodiment, the processor 230 of the server 200 may determine the content satisfying the predefined viewing conditions as the allocation target of the virtual channel based on the user's viewing history in the devices registered for the user account, such as the display apparatus 100 and the terminal apparatuses 301, 302, and 303. When a specific content is determined in this way, the information on the result may be transmitted from the server 200 to the terminal apparatus 301, and the processor 360 of the terminal apparatus 301 may receive the content of the predetermined application 161 as the allocation target of the virtual channel based on the received information.

The processor 360 may receive information on a user account being used from the server 200 through the communication interface 310, and control the display 330 to display the information as a UI as illustrated in FIG. 19. For example, an item 1901 representing the information on the user account and an item 1902 representing a device registered for the user account may be displayed on the display 330. Here, when two or more devices of the same type are registered, each device is divided and displayed in an identifiable manner. For example, as illustrated in FIG. 19, when two display apparatuses 100, that is, TVs are registered, the display apparatuses 100 may be divided and displayed as TV 1 and TV 2, and when two terminal apparatuses 301 and 302, that is, smartphones are registered, the two terminal apparatuses 301 and 302 may be divided and displayed as smartphone 1 and smartphone 2. This division may be performed by the user input, or may be automatically performed based on the identification information (manufacturer, model name, and the like) of the corresponding device.

As described in the first embodiment of FIG. 5 or the third embodiment of FIG. 14, the predefined viewing conditions may include the characteristics of the content, the viewing time (play time), the remaining time (remaining play time), or the ratio of the played time in the total running time, and the like as the time information related to the playback of the content, and the number of times of viewing the content, and the like, but is not limited thereto. In addition, the viewing time and the number of times of viewing of content may be the sum of the cases in which the viewing is performed on two or more of the devices registered for the user account.

According to another embodiment, as in the second embodiment of FIG. 11 subscribing to the YouTube channel of the web content including the plurality of sub-content, the processor 360 of the terminal apparatus 301 may identify the content as the allocation target of the virtual channel when the user selection of the content of the application 161 is received. Here, the user selection may be received from any one of the devices registered for the user account.

When the content is identified as the allocation target of the virtual channel in step 1801, the processor 360 may select the display apparatus to allocate the virtual channel (step 1802).

Here, the processor 360 may display the UI related to the allocation of the virtual channel of the display apparatus 100 on the display 330, and select the display apparatus to allocate the virtual channel based on the user input to the displayed UI.

According to one embodiment, as illustrated in FIG. 20, the processor 360 may display on the display 330 a UI that includes a message 2001 notifying that the display apparatus to which the virtual channel is allocated can be selected and items 2002 and 2003 that can select at least one of the plurality of display apparatuses in response to the message. Here, the display apparatuses corresponding to the items 2002 and 2003 may be apparatuses in which the automatic allocation option of the virtual channel is activated in the embodiments of FIGS. 5, 11, and 14.

The processor 360 may select the display apparatus to allocate the content of the application 161 to the virtual channel based on the user input to the displayed items 2002 and 2003.

According to one embodiment, a user may select a plurality of display apparatuses as the allocation target of the virtual channel. In this case, the processes of steps 1803 and 1804 described below may be performed on each of the selected display apparatuses plural times.

In step 1802, when the display apparatus 100 to allocate the virtual channel, for example, TV 1 is selected, the processor 360 may identify the second channel to be used as the virtual channel among the plurality of channels of the selected display apparatus 100 (step 1803).

The channel list 701 for the plurality of channels of the display apparatus 100 includes the first channel 702 to which the broadcast signal is allocated and the second channel that is an empty channel to which the broadcast signal is not allocated, as illustrated in FIG. 7, and according to one embodiment of FIG. 7, the channel number Nos. 900 to 1000 may be identified as the second channel.

Such a plurality of channel information may be transmitted from the display apparatus 100 to the server 200 and managed by the server 200, and the processor 360 may receive the channel information of the display apparatus 100 from the server 200 through the communication interface 310.

The processor 170 may allocate the content of the application 161 identified in step 1801 to the second channel identified in step 1803 (step 1804).

Here, the processor 360 may display the UI related to the allocation of the virtual channel on the display 330 and allocate the content of the application 161 to the second channel based on the user input to the displayed UI.

According to one embodiment, the display 330 may display the UI that includes the message notifying that the content of the application 161 can be allocated to an empty channel 900, and the item that can be selected to approve or reject the allocation of the virtual channel in response to the message.

The processor 170 may allocate the content of the executed application 161 to the predetermined second channel of the display apparatus 100, for example, the channel No. 900 based on the user input to the displayed item.

For example, as illustrated in FIG. 9, "Lost" may be allocated to channel No. 900 (902) among the second channels of a channel list 901. Here, the "Lost" includes a plurality of sub-content, that is, episodes composed of a series, so each episode (Season 1 Episode 4, Season 1 Episode 5, and Season 1 Episode 6) may be allocated to sub-channels 900-1, 900-2, and 900-3, respectively.

As another example, as illustrated in FIG. 13, the YouTube subscription channel "KBS TRAVEL" may be allocated to the channel No. 902 (1302) among the second channels of the channel list 1301. Here, the "KBS TRAVEL" channel provides a plurality of sub-content composed of a series, so each sub-content (Caribbean Travel, Granada in Spain, Athens in Greece) may be allocated to sub-channels 902-1, 902-2, and 902-3, respectively.

According to another embodiment, the processor 360 may automatically allocate the content of the application 161, for example, the "Kingdom" to the channel No. 901 among the second channels and may display on the display 330 a UI that includes a message notifying that the virtual channel is allocated and an item that can be selected to release or hold the allocation of the virtual channel in response to the message. As illustrated in FIG. 9, the processor 170 may allocate the content of the executed application 161 to the second channel based on the user input to the displayed items.

When the content of the application 161 is allocated to the second channel in step 1804, the processor 360 may notify the server 200 of the allocation of the content to the virtual channel (step 1805). Here, the processor 360 may transmit information, such as a type of content to which the virtual channel is allocated and an allocated second channel number, to the server 200 through the communication interface 310.

In addition, the information on the virtual channel may be transmitted from the server 200 to the display apparatus 100 selected in step 1802 (step 1806). That is, the processor 230 of the server 200 may store the received information in the storage 220 based on the reception of the notification in step 1805, and control the communication interface 210 to transmit the information on the virtual content to the display apparatus 100.

Here, the information transmitted to the display apparatus 100 includes the information (second channel) on the virtual channel to which the content is allocated and the information on the content allocated to the second channel. The processor 170 of the display apparatus 100 may identify the second channel from the channel list stored in the storage 160 or allocate the content to the second channel, based on the information on the received virtual channel. That is, the information on the transmitted virtual channel may include the information on the content to which the virtual channel is allocated from the external device of the display apparatus 100, that is, the terminal apparatus 301.

In addition, the information transmitted to the display apparatus 100 may further include the security information for the display apparatus 100 to access the server 200, for example, the user account, the password, and the information on the address, that is, the uniform resource locator (URL) to which the content to which the virtual channel is allocated may be directly downloaded. The processor 170 of the display apparatus 100 stores the received information in the storage 160.

In the embodiment according to the disclosure, according to the operations of steps 1801 to 1806 as described above, the terminal apparatus 301 performs the operation of allocating the virtual channel of the display apparatus 100 to the content of the application 161.

Thereafter, as described in step 509 of FIG. 5, step 1109 of FIG. 11, and step 1407 of FIG. 14, the display apparatus 100 displays on the display 140 the image of the content based on the selection of the second channel to which the content is allocated.

Accordingly, not only the display apparatus 100 but also the terminal apparatus 301 that is more easily manipulated by the user is used to select the display apparatus 100 and allocate the content of the application 161 to the virtual channel, that is, the second channel.

Hereinabove, the disclosure has been described in detail through the preferred embodiments, but the disclosure is not limited thereto and may be implemented in various ways within the scope of the claims.

What is claimed is:

1. A display apparatus, comprising:
   a display;
   a receiver configured to receive a broadcast signal having a plurality of channels;
   a communication interface configured to communicate with a server;
   a user input interface configured to receive user inputs; and
   a processor configured to:
   control the display to display an image of a first channel among the plurality of channels based on the broadcast signal received through the receiver,
   execute an application to receive content data for a content selected by a user from contents provided via the executed application from the server through the communication interface,
   control the display to display a content image corresponding to the content selected by the user,
   while the content image is displayed, receive a first user input through the user input interface,
   based on the first user input received while the content image is displayed, add a second channel corresponding to the content selected by the user to the plurality of channels, and
   after the second channel is added, access the server through the communication interface to display the content image based on a second user input selecting the second channel.

2. The display apparatus of claim 1, wherein the first user input includes a user input for switching an application being executed in a foreground mode to a background mode.

3. The display apparatus of claim 1, wherein the processor is configured to determine whether or not a predefined viewing condition is satisfied based on a user's viewing history of the content selected by the user when an operation of registering a virtual channel is performed, and then add the second channel corresponding to the content selected by the user when the predefined viewing condition is satisfied.

4. The display apparatus of claim 3, wherein the processor is configured to receive the information on the viewing history or the viewing condition from the application.

5. The display apparatus of claim 1, wherein the processor is configured to allow the application to perform an operation of registering a virtual channel, and add the second channel corresponding to the content selected by the user based on a request received from the application performing the operation of registering the virtual channel.

6. The display apparatus of claim 1, wherein the processor is configured to
receive information on a virtual channel from the server, and
identify the second channel to be used as the virtual channel or add the second channel corresponding to the content selected by the user, based on the received information on the virtual channel.

7. The display apparatus of claim 6, wherein the information on the virtual channel includes information on content corresponding to the virtual channel added by an external device or content viewed by the external device.

8. The display apparatus of claim 1, wherein the processor is configured to transmit information on the second channel to be used as a virtual channel or the content corresponding to the added second channel to the server.

9. The display apparatus of claim 1, wherein the processor is configured to control the display to display a user interface (UI) related to registration of a virtual channel.

10. The display apparatus of claim 9, wherein the UI includes an item for selecting whether or not to register the virtual channel for the content selected by the user, and
the processor is configured to execute an operation of registering the virtual channel based on a user input for the item.

11. The display apparatus of claim 1, wherein the processor is configured to control the communication interface to receive the content data for the content selected by the user from the server based on a uniform resource locator (URL) of the content, in response to the selection of the added second channel.

12. The display apparatus of claim 1, wherein the content corresponding to the added second channel includes a plurality of sub- content consisting of a series, and
the processor is configured to release the content selected by the user from the second channel based on the viewing of the plurality of sub-content being completed.

13. A method for controlling a display apparatus, comprising:
displaying an image of a first channel of a plurality of channels based on a broadcast signal received through a receiver;
executing an application to receive content data for a content selected by a user from contents provided via the executed application from a server and to display a content image corresponding to the content selected by the user;
while the content image is displayed, receiving a first user input through the user input interface;
based on the first user input received while the content image is displayed, adding a second channel corresponding to the content selected by the user to the plurality of channels; and
after the second channel is added, accessing the server to display the content image based on a second user input selecting the second channel.

14. The method for claim 13, wherein the first user input includes a user input for switching an application being executed in a foreground mode to a background mode.

15. The method for claim 13, wherein the adding the second channel includes:
determining whether a predefined viewing condition is satisfied based on a user's viewing history of the content selected by the user when an operation of registering a virtual channel is executed; and
adding the second channel corresponding to the content selected by the user when the predefined viewing condition is satisfied.

16. The method for claim 13, wherein in the adding the second channel, the application performs an operation of registering a virtual channel, and the second channel corresponding to content selected by the user is added based on a request received from the application performing the operation of registering the virtual channel.

17. The method for claim 13, further comprising:
displaying a user interface (UI) related to a registration of a virtual channel.

18. The method for claim 13, wherein the accessing the server includes receiving the content data for the content selected by the user from the server based on a uniform resource locator (URL) of the content, in response to the selection of the second channel.

19. The method for claim 13, further comprising:
releasing the content selected by the user from the second channel based on the viewing of the plurality of sub-content being completed,
wherein the content corresponding to the added second channel includes a plurality of sub-content consisting of a series.

20. A computer-readable non-transitory recording media recorded with a program executable by a processor of a display apparatus to perform:
displaying an image of a first channel of a plurality of channels based on a broadcast signal received through a receiver;
executing an application to receive content data for a content selected by a user from contents provided via the executed application from a server and to display a content image corresponding to the content selected by the user;
while the content image is displayed, receiving a first user input through the user input interface;
based on the first user input received while the content image is displayed, adding a second channel corresponding to the content selected by the user to the plurality of channels; and
after the second channel is added, accessing the server to display the content image based on second user input selecting the second channel.

* * * * *